US012569721B2

(12) United States Patent
Canberk et al.

(10) Patent No.: US 12,569,721 B2
(45) Date of Patent: Mar. 10, 2026

(54) VIRTUAL EVALUATION TOOLS FOR AUGMENTED REALITY EXERCISE EXPERIENCES

(71) Applicants: Ilteris Canberk, Marina Del Rey, CA (US); Ivan Fekete, Odessa (UA); Shin Hwun Kang, Los Angeles, CA (US); Dmytro Kucher, Odessa (UA); Ihor Kuzin, Kyiv (UA); Vernon James Carlos Manlapaz, Glendale, CA (US); Artur Sydoran, Uzhhorod (UA)

(72) Inventors: Ilteris Canberk, Marina Del Rey, CA (US); Ivan Fekete, Odessa (UA); Shin Hwun Kang, Los Angeles, CA (US); Dmytro Kucher, Odessa (UA); Ihor Kuzin, Kyiv (UA); Vernon James Carlos Manlapaz, Glendale, CA (US); Artur Sydoran, Uzhhorod (UA)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/922,930

(22) Filed: Oct. 22, 2024

(65) Prior Publication Data

US 2025/0041661 A1     Feb. 6, 2025

Related U.S. Application Data

(63) Continuation of application No. 17/584,513, filed on Jan. 26, 2022, now Pat. No. 12,151,138.

(51) Int. Cl.
*A63B 24/00* (2006.01)
*G02B 27/01* (2006.01)
(Continued)

(52) U.S. Cl.
CPC ........ *A63B 24/0003* (2013.01); *G02B 27/017* (2013.01); *G06F 3/011* (2013.01);
(Continued)

(58) Field of Classification Search
CPC .............. A63B 24/003; A63B 71/0622; A63B 2071/0625; A63B 2071/0666;
(Continued)

(56) References Cited

U.S. PATENT DOCUMENTS 11,145,126 B1   10/2021   Bramwell et al.
11,996,070 B1   5/2024   Helms
(Continued)

OTHER PUBLICATIONS

International Search Report and Written Opinion for International Application No. PCT/US2022/028515, dated Aug. 4, 2022 (Aug. 4, 2022)—11 pages.

*Primary Examiner* — Adam J Snyder
(74) *Attorney, Agent, or Firm* — CM Law; Stephen J. Weed

(57) ABSTRACT

Example systems, devices, media, and methods are described for evaluating movements and physical exercises in augmented reality using the display of an eyewear device. A motion evaluation application implements and controls the capturing of frames of motion data using an inertial measurement unit (IMU) on the eyewear device. The method includes presenting virtual targets on the display, localizing the current eyewear device location based on the captured motion data, and presenting virtual indicators on the display. The virtual targets represent goals or benchmarks for the user to achieve using body postures. The method includes detecting determining whether the eyewear device location represents an intersecting posture relative to the virtual targets, based on the IMU data. The virtual indicators display real-time feedback about user posture or performance relative to the virtual targets.

20 Claims, 16 Drawing Sheets

(51) Int. Cl.

| | |
|---|---|
| *G06F 3/01* | (2006.01) |
| *G06V 40/20* | (2022.01) |
| *A63B 71/06* | (2006.01) |
| *G06F 3/0354* | (2013.01) |

(52) U.S. Cl.

CPC .............. *G06F 3/017* (2013.01); *G06V 40/28* (2022.01); *A63B 71/0622* (2013.01); *A63B 2071/0625* (2013.01); *A63B 2071/0666* (2013.01); *A63B 2244/102* (2013.01); *G02B 2027/0178* (2013.01); *G06F 3/012* (2013.01); *G06F 3/015* (2013.01); *G06F 3/016* (2013.01); *G06F 3/03547* (2013.01)

(58) Field of Classification Search

CPC .......... A63B 2244/102; A63B 24/0003; G02B 27/017; G02B 2027/0178; G06F 3/011; G06F 3/017; G06F 3/012; G06F 3/015; G06F 3/016; G06F 3/03547; G06V 40/28

See application file for complete search history.

(56) References Cited

U.S. PATENT DOCUMENTS

| | | | | |
|---|---|---|---|---|
| 11,998,798 | B2 | 6/2024 | Hong | |
| 12,151,138 | B2 * | 11/2024 | Canberk | .............. G02B 27/017 |
| 2013/0095924 | A1 | 4/2013 | Geisner et al. | |
| 2017/0266551 | A1 | 9/2017 | Baba | |
| 2018/0121728 | A1 * | 5/2018 | Wells | ................. G02B 27/0093 |
| 2019/0160339 | A1 | 5/2019 | Zhang et al. | |
| 2019/0311539 | A1 | 10/2019 | Hogue | |
| 2020/0104039 | A1 | 4/2020 | Robertson et al. | |
| 2021/0004981 | A1 | 1/2021 | Song et al. | |
| 2021/0008413 | A1 | 1/2021 | Asikainen et al. | |
| 2021/0072947 | A1 | 3/2021 | Anderson et al. | |
| 2021/0154529 | A1 | 5/2021 | Barr | |
| 2022/0080260 | A1 | 3/2022 | Zhang et al. | |
| 2022/0245880 | A1 | 8/2022 | Thielen et al. | |
| 2024/0045704 | A1 | 2/2024 | Khorshid | |
| 2024/0050831 | A1 | 2/2024 | Canberk et al. | |

* cited by examiner

100

111B

114B

140B

110B

125B

126B

190

105

Mobile
Device
401

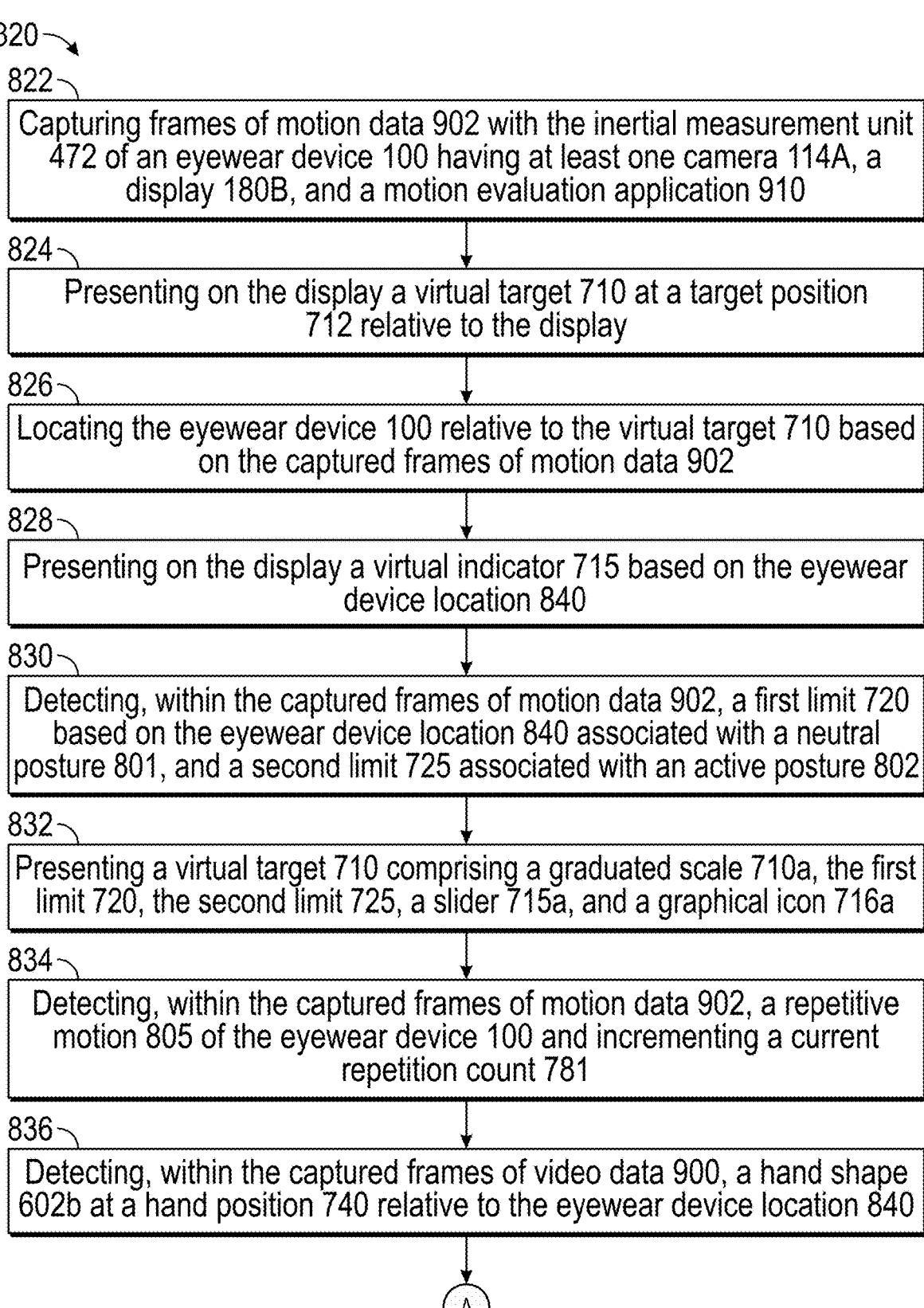

820

822
Capturing frames of motion data 902 with the inertial measurement unit 472 of an eyewear device 100 having at least one camera 114A, a display 180B, and a motion evaluation application 910

824
Presenting on the display a virtual target 710 at a target position 712 relative to the display 826
Locating the eyewear device 100 relative to the virtual target 710 based on the captured frames of motion data 902

828
Presenting on the display a virtual indicator 715 based on the eyewear device location 840

830
Detecting, within the captured frames of motion data 902, a first limit 720 based on the eyewear device location 840 associated with a neutral posture 801, and a second limit 725 associated with an active posture 802

832
Presenting a virtual target 710 comprising a graduated scale 710a, the first limit 720, the second limit 725, a slider 715a, and a graphical icon 716a 834
Detecting, within the captured frames of motion data 902, a repetitive motion 805 of the eyewear device 100 and incrementing a current repetition count 781

836
Detecting, within the captured frames of video data 900, a hand shape 602b at a hand position 740 relative to the eyewear device location 840

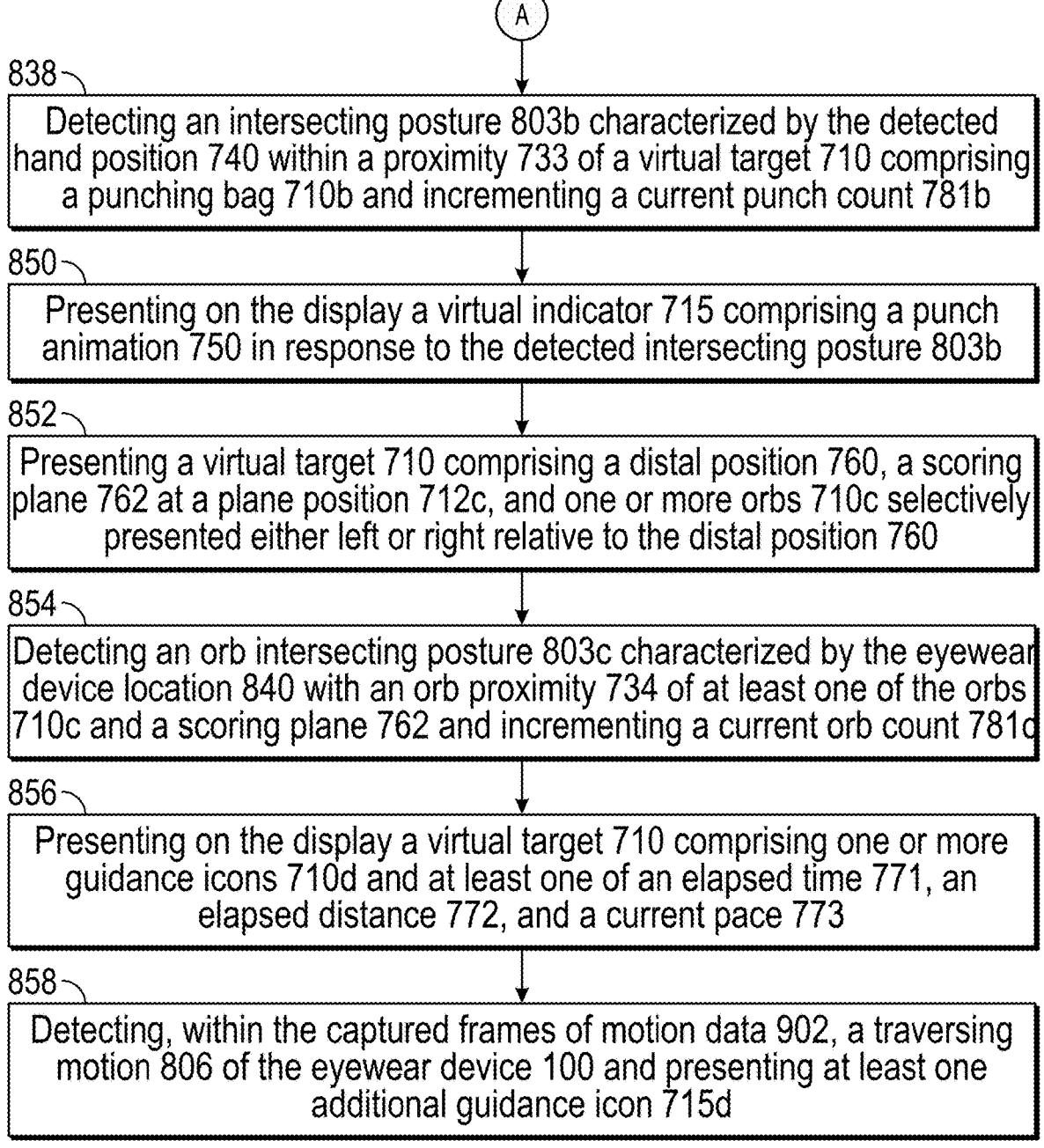

(A)

838 —
Detecting an intersecting posture 803b characterized by the detected hand position 740 within a proximity 733 of a virtual target 710 comprising a punching bag 710b and incrementing a current punch count 781b 850 —
Presenting on the display a virtual indicator 715 comprising a punch animation 750 in response to the detected intersecting posture 803b 852 —
Presenting a virtual target 710 comprising a distal position 760, a scoring plane 762 at a plane position 712c, and one or more orbs 710c selectively presented either left or right relative to the distal position 760

854 —
Detecting an orb intersecting posture 803c characterized by the eyewear device location 840 with an orb proximity 734 of at least one of the orbs 710c and a scoring plane 762 and incrementing a current orb count 781c 856 —
Presenting on the display a virtual target 710 comprising one or more guidance icons 710d and at least one of an elapsed time 771, an elapsed distance 772, and a current pace 773

858 —
Detecting, within the captured frames of motion data 902, a traversing motion 806 of the eyewear device 100 and presenting at least one additional guidance icon 715d

FIG. 8
(Continued)

VIRTUAL EVALUATION TOOLS FOR AUGMENTED REALITY EXERCISE EXPERIENCES

CROSS-REFERENCE TO RELATED APPLICATIONS

This application is a Continuation of U.S. application Ser. No. 17/584,513 filed on Jan. 26, 2022, the contents of which are incorporated fully herein by reference.

TECHNICAL FIELD

Examples set forth in the present disclosure relate to the field of augmented reality experiences for electronic devices, including wearable devices such as eyewear. More particularly, but not by way of limitation, the present disclosure describes the presentation of virtual evaluation tools for analyzing movement and physical exercises in augmented reality.

BACKGROUND

Many types of computers and electronic devices available today, such as mobile devices (e.g., smartphones, tablets, and laptops), handheld devices, and wearable devices (e.g., smart glasses, digital eyewear, headwear, headgear, and head-mounted displays), include a variety of cameras, sensors, wireless transceivers, input systems, and displays.

Virtual reality (VR) technology generates a complete virtual environment including realistic images, sometimes presented on a VR headset or other head-mounted display. VR experiences allow a user to move through the virtual environment and interact with virtual objects. Augmented reality (AR) is a type of VR technology that combines real objects in a physical environment with virtual objects and displays the combination to a user. The combined display gives the impression that the virtual objects are authentically present in the environment, especially when the virtual objects appear and behave like the real objects. Cross reality (XR) is generally understood as an umbrella term referring to systems that include or combine elements from AR, VR, and MR (mixed reality) environments.

Graphical user interfaces allow the user to interact with displayed content, including virtual objects and graphical elements such as icons, taskbars, list boxes, menus, buttons, and selection control elements like cursors, pointers, handles, and sliders.

Automatic speech recognition (ASR) is a field of computer science, artificial intelligence, and linguistics which involves receiving spoken words and converting the spoken words into audio data suitable for processing by a computing device. Processed frames of audio data can be used to translate the received spoken words into text or to convert the spoken words into commands for controlling and interacting with various software applications. ASR processing may be used by computers, handheld devices, wearable devices, telephone systems, automobiles, and a wide variety of other devices to facilitate human-computer interactions.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 8 is a flow chart listing the steps in an example method of presenting an exercise experience on a display.

DETAILED DESCRIPTION

Figure 1A:
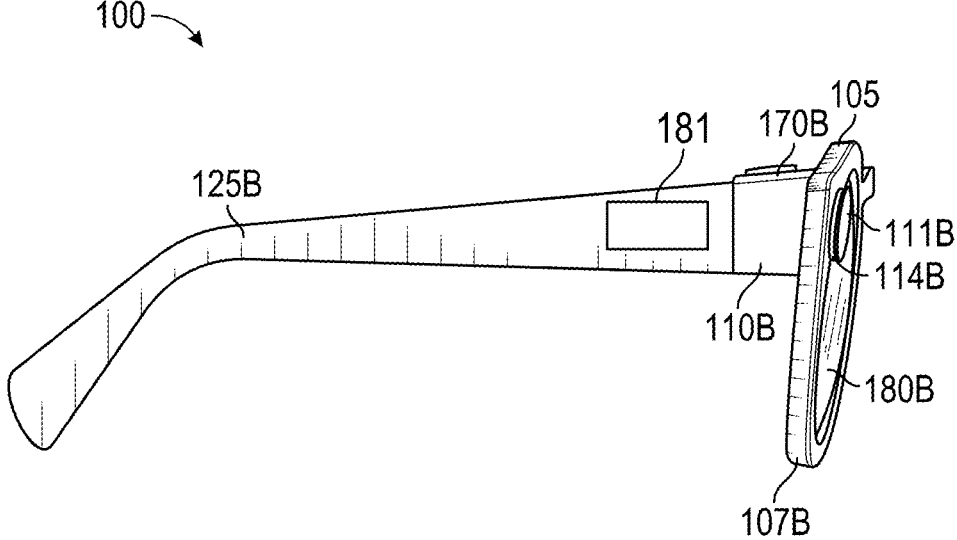
FIG. 1A is a side view (right) of an example hardware configuration of an eyewear device suitable for use in an example virtual guided fitness system.

Various implementations and details are described with reference to examples for presenting an exercise experience with virtual targets in augmented reality. For example, the method includes presenting virtual targets on the display, localizing the current eyewear device location based on the frames of motion data captured by an IMU, and presenting virtual indicators on the display. The virtual targets represent goals or benchmarks for the user to achieve using body postures. The method includes detecting determining whether the eyewear device location represents an intersecting posture relative to the virtual targets, based on the IMU data. The virtual indicators display real-time feedback about user posture or performance relative to the virtual targets.

An example implementation includes a virtual target comprising a graduated scale and a virtual indicator comprising a slider that moves along the scale according to the current eyewear device location, based on the IMU data.

Another example implementation includes a virtual target comprising a punching bag and a virtual indicator comprising animated boxing gloves displayed according to hand location. The hand detection relies on image data captured by at least one camera. The motion evaluation application detects when the hand location intersects the virtual punching bag, based on either the IMU data or the image data, or both.

Another example implementation includes a virtual target comprising one or more orbs in apparent motion toward a scoring plane in either a left lane or a right lane. The virtual indicator comprises a visible change in the orb when the application detects an intersection between the eyewear device location, moving side to side, and one of the orbs, based on the IMU data.

Although the various systems and methods are described herein with reference to fitness, exercises, and exercise equipment, the technology described may be applied to detecting any type of motion or activity occurring in a physical environment, capturing data about the detected activity, and presenting scores or other evaluation metrics, compared to benchmarks, on a display.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, coupled components, and any other devices such as those shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera, inertial measurement unit, or display as constructed or as otherwise described herein.

Advanced AR technologies, such as computer vision and object tracking, may be used to produce a perceptually enriched and immersive experience. Computer vision algorithms extract three-dimensional data about the physical world from the data captured in digital images or video. Object recognition and tracking algorithms are used to detect an object in a digital image or video, estimate its orientation or pose, and track its movement over time. Hand and finger recognition and tracking in real time is one of the most challenging and processing-intensive tasks in the field of computer vision.

The term "pose" refers to the static position and orientation of an object at a particular instant in time. The term "gesture" refers to the active movement of an object, such as a hand, through a series of poses, sometimes to convey a signal or idea. The terms, pose and gesture, are sometimes used interchangeably in the field of computer vision and augmented reality. As used herein, the terms "pose" or "gesture" (or variations thereof) are intended to be inclusive of both poses and gestures; in other words, the use of one term does not exclude the other.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below. FIG. 1A is a side view (right) of an example hardware configuration of an eyewear device 100 which includes a touch-sensitive input device such as a touchpad 181. As shown, the touchpad 181 may have a boundary that is plainly visible or include a raised or otherwise tactile edge that provides feedback to the user about the location and boundary of the touchpad 181; alternatively, the boundary may be subtle and not easily seen or felt. In other implementations, the eyewear device 100 may include a touchpad 181 on the left side that operates independently or in conjunction with a touchpad 181 on the right side.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Tapping or double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a graphical user interface element in the image presented on the image display of the optical assembly 180A, 180B. An adjustment to the image presented on the image display of the optical assembly 180A, 180B based on the identified finger gesture can be a primary action which selects or submits the graphical user interface element on the image display of the optical assembly 180A, 180B for further display or execution.

As shown, the eyewear device 100 includes a right visible-light camera 114B. As further described herein, two cameras 114A, 114B capture image information for a scene from two separate viewpoints. The two captured images may be used to project a three-dimensional display onto an image display for viewing with 3D glasses.

Figure 1B:
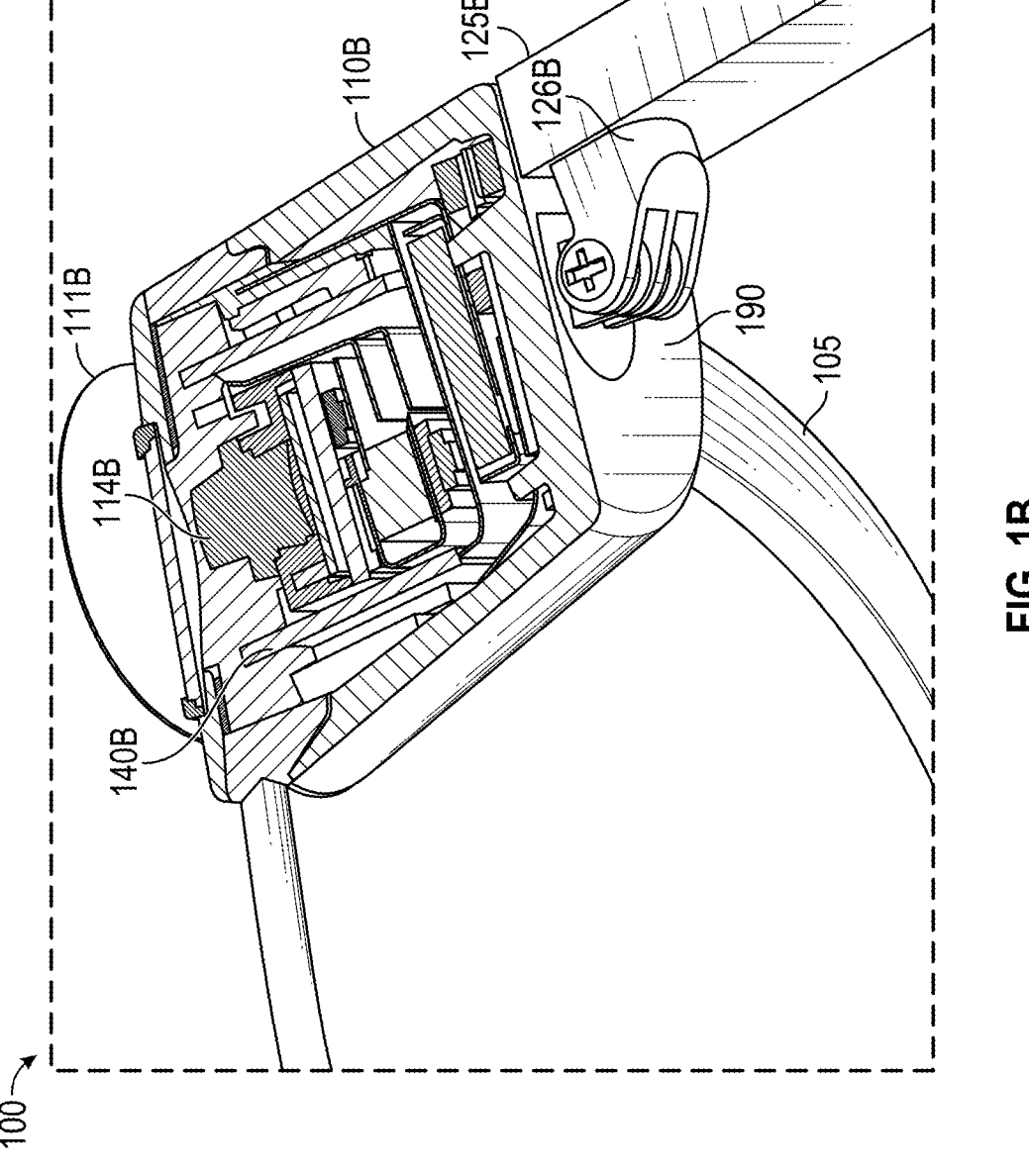
FIG. 1B is a perspective, partly sectional view of a right corner of the eyewear device of FIG. 1A depicting a right visible-light camera, and a circuit board.
Figure 1C:
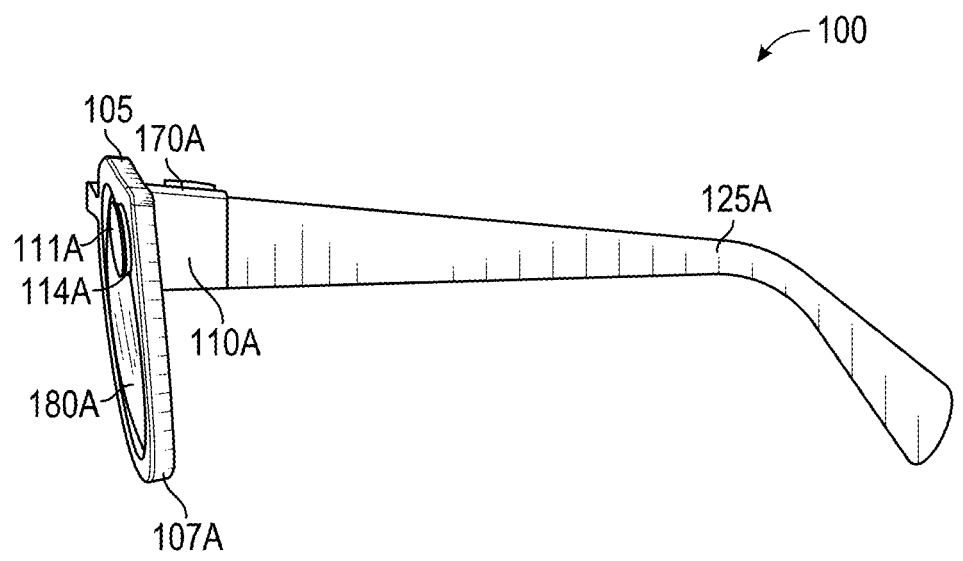
FIG. 1C is a side view (left) of an example hardware configuration of the eyewear device of FIG. 1A, which shows a left visible-light camera.
Figure 1D:
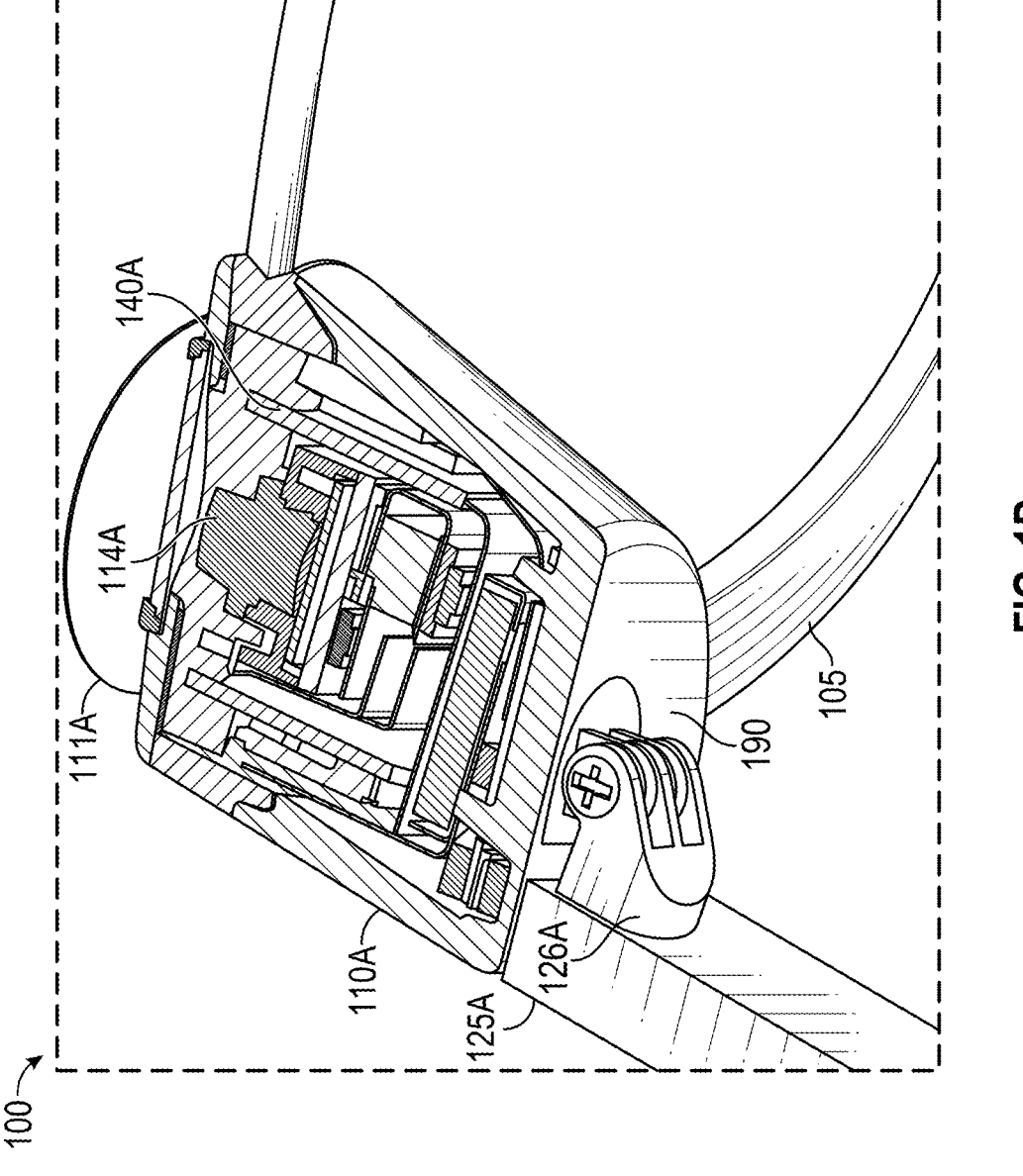
FIG. 1D is a perspective, partly sectional view of a left corner of the eyewear device of FIG. 1C depicting the left visible-light camera, and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as stereo camera, of which the right visible-light camera 114B is located on a right corner 110B. As shown in FIGS. 1C-D, the eyewear device 100 also includes a left visible-light camera 114A.

Figure 3:
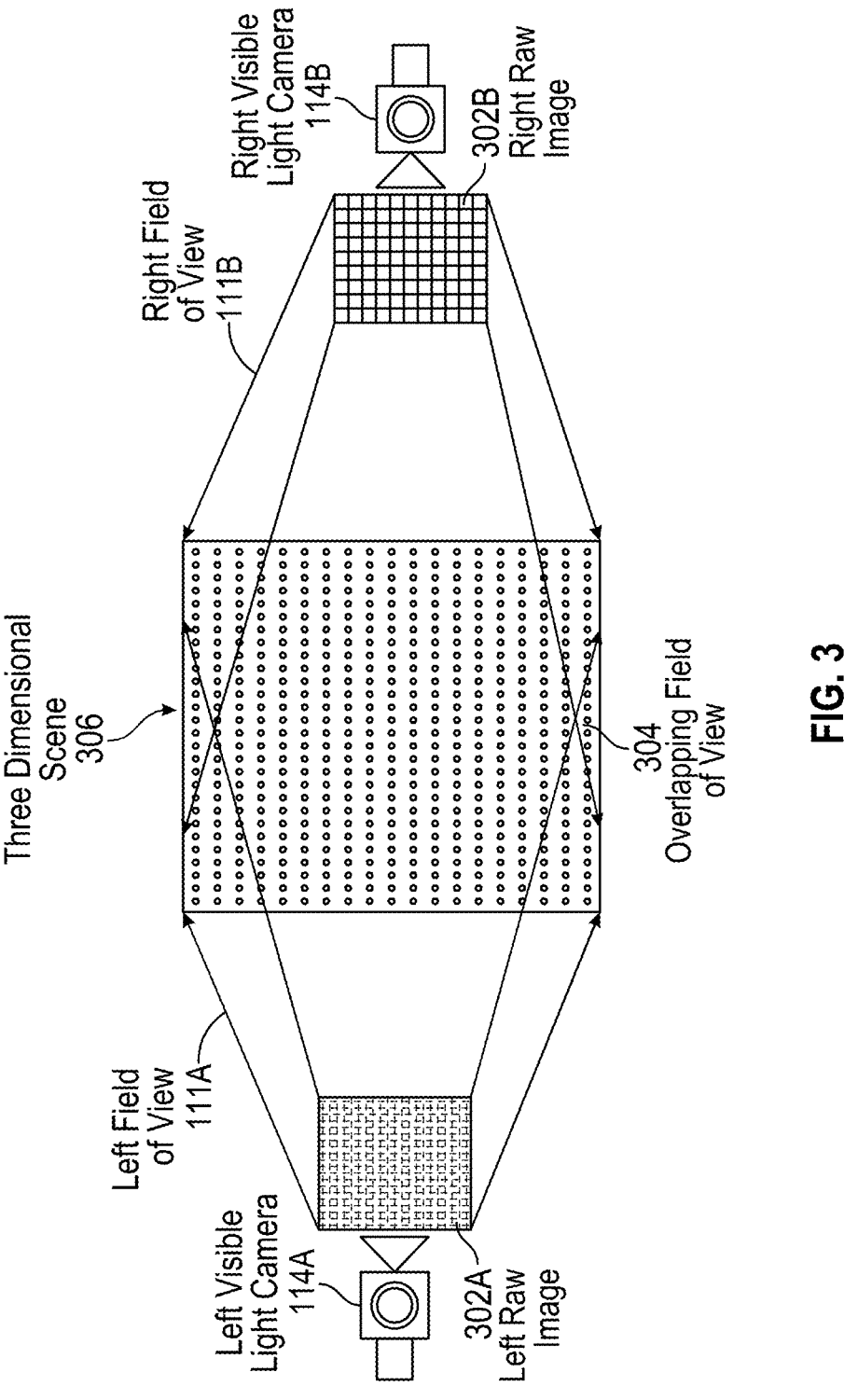
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent, which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both visible-light cameras 114A, 114B has a field of view of 100° and a resolution of 480×480 pixels. The "angle of coverage" describes the angle range that a lens of visible-light cameras 114A, 114B or infrared camera 410 (see FIG. 2A) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semi-conductor (CMOS) image sensor and a digital VGA camera (video graphics array) capable of resolutions of 480p (e.g., 640×480 pixels), 720p, 1080p, or greater. Other examples include visible-light cameras 114A, 114B that can capture high-definition (HD) video at a high frame rate (e.g., thirty to sixty frames per second, or more) and store the recording at a resolution of 1216 by 1216 pixels (or greater).

The eyewear device 100 may capture image sensor data from the visible-light cameras 114A, 114B along with geo-location data, digitized by an image processor, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

FIG. 1B is a perspective, cross-sectional view of a right corner 110B of the eyewear device 100 of FIG. 1A depicting the right visible-light camera 114B of the camera system, and a circuit board. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the three-dimensional camera, and a circuit board.

Construction and placement of the left visible-light camera 114A is substantially similar to the right visible-light camera 114B, except the connections and coupling are on the left lateral side 170A. As shown in the example of FIG. 1B, the eyewear device 100 includes the right visible-light camera 114B and a circuit board 140B, which may be a flexible printed circuit board (PCB). A right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B. A left hinge 126B connects the left corner 110A to a left temple 125A of the eyewear device 100. In some examples, components of the left visible-light camera 114A, the flexible PCB 140A, or other electrical connectors or contacts may be located on the left temple 125A or the left hinge 126A.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, microphone(s) 139, loudspeaker(s) 191, low-power wireless circuitry (e.g., for wireless short range network communication via Bluetooth™), high-speed wireless circuitry (e.g., for wireless local area network communication via Wi-Fi).

Figure 2A:
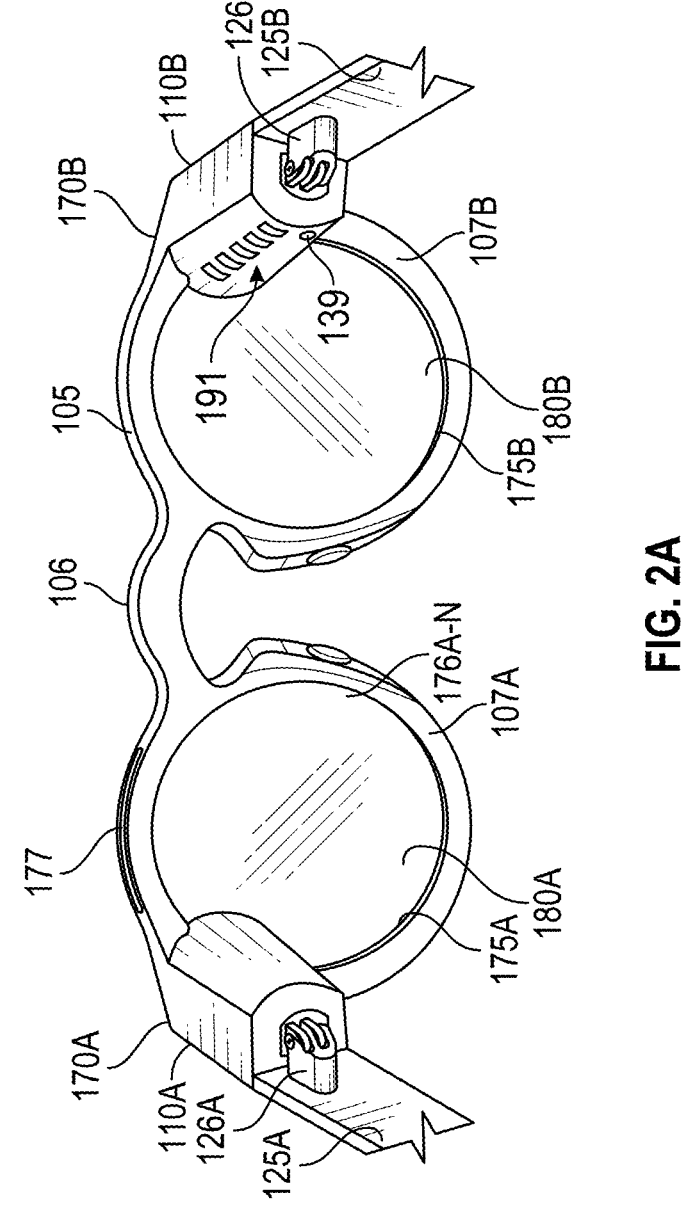
FIGS. 2A and 2B are rear views of example hardware configurations of an eyewear device utilized in an example virtual guided fitness system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
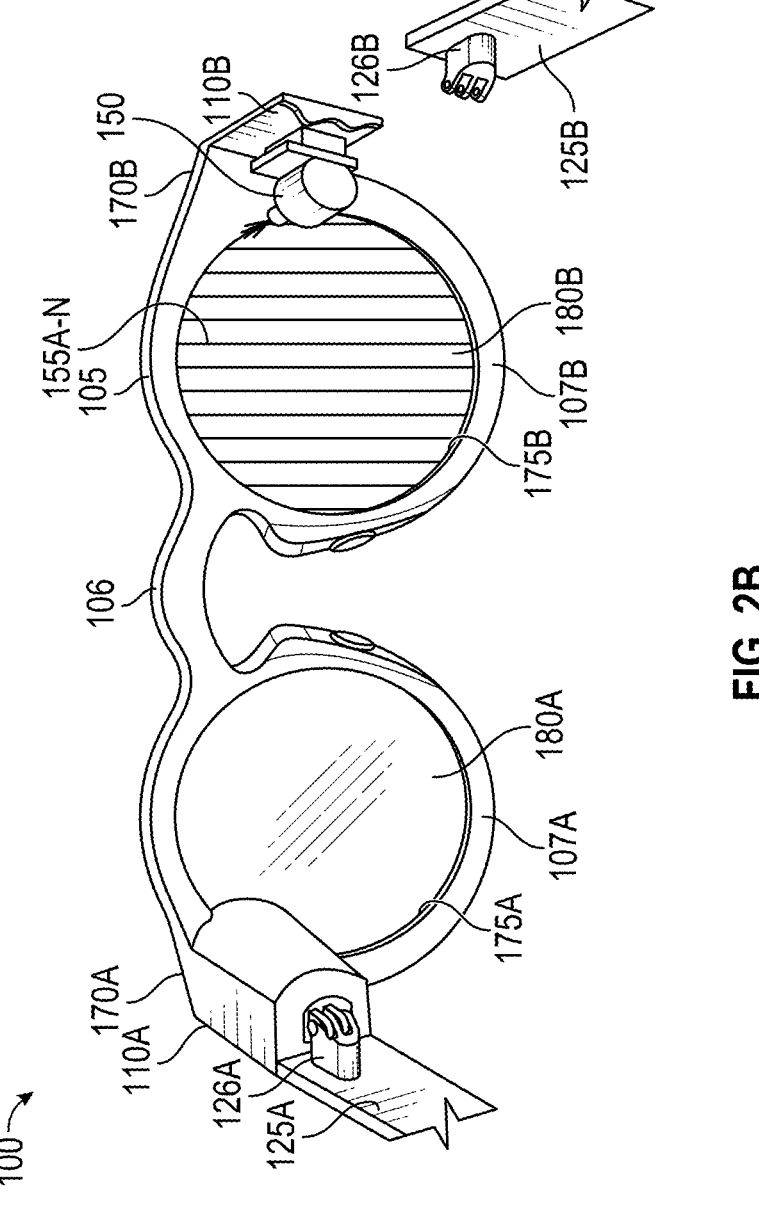

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge or diverge or that cause little or no convergence or divergence.

FIG. 2A is an example hardware configuration for the eyewear device 100 in which the right corner 110B supports a microphone 139 and a loudspeaker 191. The microphone 139 includes a transducer that converts sound into a corresponding electrical audio signal. The microphone 139 in this example, as shown, is positioned with an opening that faces inward toward the wearer, to facilitate reception of the sound waves, such as human speech including verbal commands and questions. Additional or differently oriented openings may be implemented. In other example configurations, the eyewear device 100 is coupled to one or more microphones 139, configured to operate together or independently, and positioned at various locations on the eyewear device 100.

The loudspeaker 191 includes an electro-acoustic transducer that converts an electrical audio signal into a corresponding sound. The loudspeaker 191 is controlled by one of the processors 422, 432 or by an audio processor 413 (FIG.

4). The loudspeaker 191 in this example includes a series of oblong apertures, as shown, that face inward to direct the sound toward the wearer. Additional or differently oriented apertures may be implemented. In other example configurations, the eyewear device 100 is coupled to one or more loudspeakers 191, configured to operate together (e.g., in stereo, in zones to generate surround sound) or independently, and positioned at various locations on the eyewear device 100. For example, one or more loudspeakers 191 may be incorporated into the frame 105, temples 125, or corners 110A, 110B of the eyewear device 100.

Although shown in FIG. 2A and FIG. 2B as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light to the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, may control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

As further shown in FIGS. 2A and 2B, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective lateral sides 170A, 170B (as illustrated) or implemented as separate components attached to the frame 105 on the respective sides 170A, 170B. Alternatively, the corners 110A, 110B may be integrated into temples 125A, 125B attached to the frame 105.

In another example, the eyewear device 100 shown in FIG. 2B may include two projectors, a left projector 150A (not shown) and a right projector 150B (shown as projector 150). The left optical assembly 180A may include a left display matrix 177A (not shown) or a left set of optical strips 155'A, 155'B, . . . 155'N (155 prime, A through N, not shown) which are configured to interact with light from the left projector 150A. Similarly, the right optical assembly 180B may include a right display matrix 177B (not shown) or a right set of optical strips 155"A, 155"B, . . . 155"N (155 double prime, A through N, not shown) which are configured to interact with light from the right projector 150B. In this example, the eyewear device 100 includes a left display and a right display.

FIG. 3 is a diagrammatic depiction of a three-dimensional scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a time-stamp, which allows the images to be displayed together as part of a three-dimensional projection.

For the capture of stereo images, as illustrated in FIG. 3, a pair of raw red, green, and blue (RGB) images are captured of a real scene 306 at a given moment in time-a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

The generated depth images are in the three-dimensional space domain and can comprise a matrix of vertices on a three-dimensional location coordinate system that includes an X axis for horizontal position (e.g., length), a Y axis for vertical position (e.g., height), and a Z axis for depth (e.g., distance). Each vertex may include a color attribute (e.g., a red pixel light value, a green pixel light value, or a blue pixel light value); a position attribute (e.g., an X location coordinate, a Y location coordinate, and a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the motion evaluation system 400 (FIG. 4) includes the eyewear device 100, which includes a frame 105 and a left temple 125A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 125A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

Figure 4:
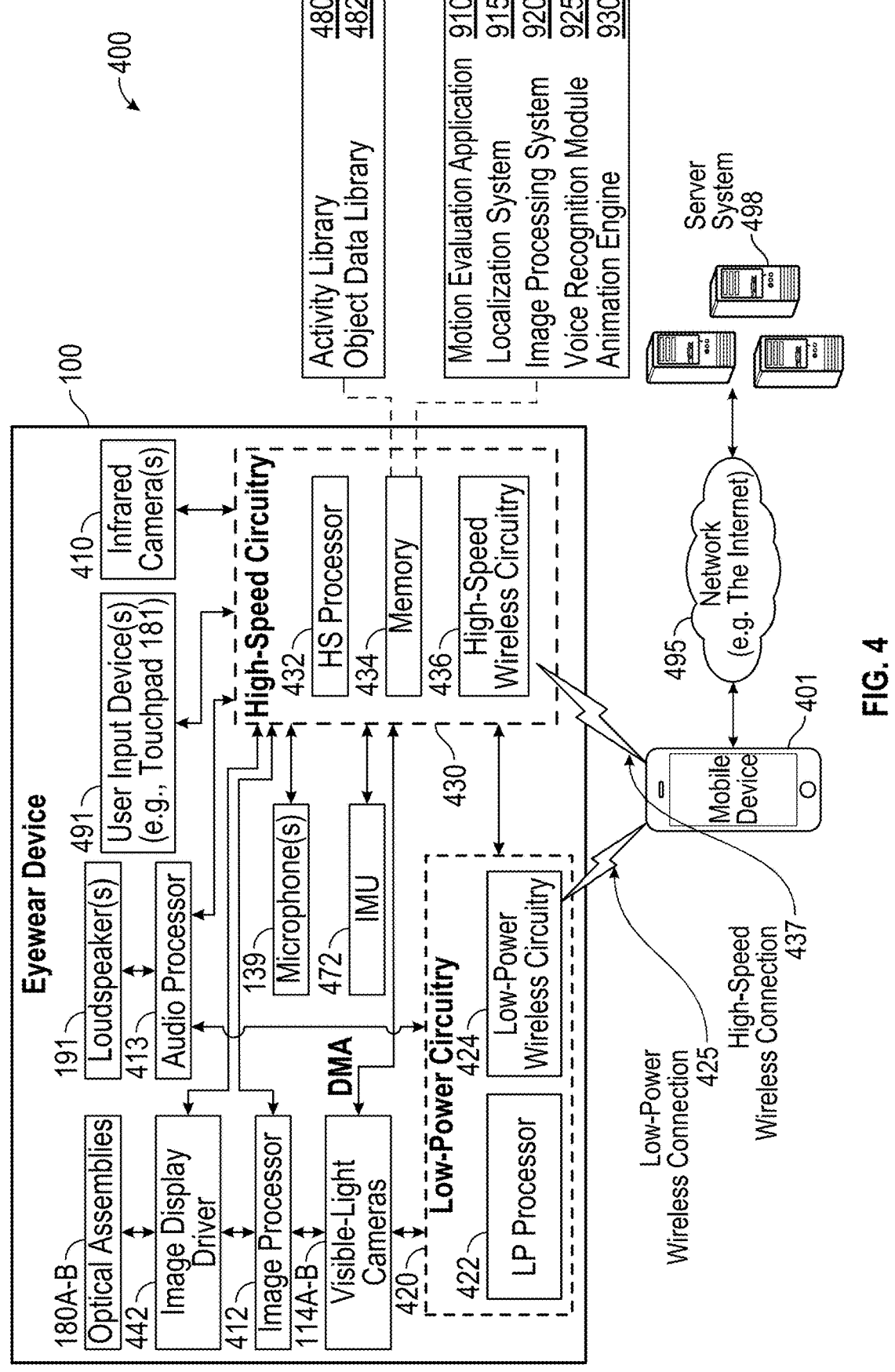
FIG. 4 is a functional block diagram of an example motion evaluation system including an eyewear device and a server system connected via various networks.

FIG. 4 is a functional block diagram of an example motion evaluation system 400 that includes an eyewear device 100, a mobile device 401, and a server system 498 connected via various networks 495 such as the Internet. As shown, the motion evaluation system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene. The device 100 may also include a depth sensor that uses infrared signals to estimate the position of objects relative to the device 100. The depth sensor in some examples includes one or more infrared emitter(s) and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (Bluetooth™ or Bluetooth Low-Energy (BLE)) and wireless wide, local, or wide-area network transceivers (e.g., cellular or Wi-Fi). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

As shown in FIG. 4, various elements of the eyewear device 100 can be coupled to the low-power circuitry 420, high-speed circuitry 430, or both. For example, the infrared camera 410 (including in some implementations an infrared emitter), the user input elements 491 (e.g., a button switch, a touchpad 181, a microphone 139), and the inertial measurement unit (IMU) 472 may be coupled to the low-power circuitry 420, high-speed circuitry 430, or both.

Figure 5:
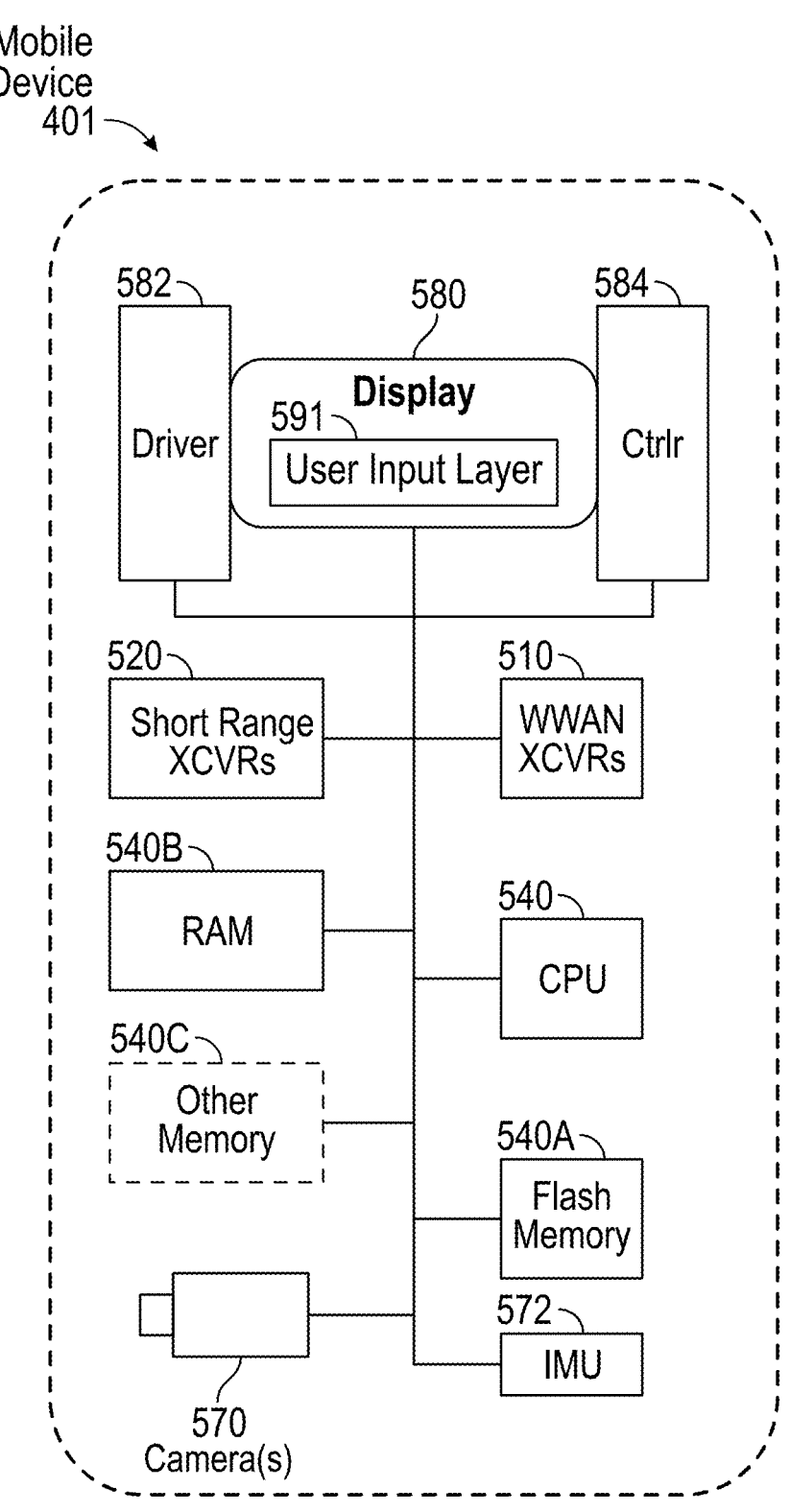
FIG. 5 is a diagrammatic representation of an example hardware configuration for a mobile device suitable for use in the example motion evaluation system of FIG. 4.

As shown in FIG. 5, the CPU 530 of the mobile device 401 may be coupled to a camera system 570, a mobile display driver 582, a user input layer 591, and a memory 540A.

The server system 498 may be one or more computing devices as part of a service or network computing system, for example, that include a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 may include a user-facing indicator (e.g., an LED, a loudspeaker 191, or a vibrating actuator), or an outward-facing signal (e.g., an LED, a loudspeaker 191). The image displays of each optical assembly 180A, 180B are driven by the image display driver 442. In some example configurations, the output components of the eyewear device 100 further include additional indicators such as audible elements (e.g., loudspeakers 191), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, one or more speakers 191 positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker 191, or an actuator that is configured and positioned to be sensed by an observer.

The input components 491 of the eyewear device 100 may include alphanumeric input components (e.g., a touch screen or touchpad 181 configured to receive alphanumeric input, a photo-optical keyboard, or other alphanumeric-configured elements), pointer-based input components (e.g., a mouse, a touchpad 181, a trackball, a joystick, a motion sensor, or other pointing instruments), tactile input components (e.g., a button switch, a touch screen or touchpad 181 that senses the location, force or location and force of touches or touch gestures, or other tactile-configured elements), and audio input components (e.g., a microphone 139), and the like. The mobile device 401 and the server system 498 may include alphanumeric, pointer-based, tactile, audio, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit 473, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

The motion evaluation system 400, as shown in FIG. 4, includes a computing device, such as mobile device 401, coupled to an eyewear device 100 over a network. The motion evaluation system 400 includes a memory for storing instructions and a processor for executing the instructions. Execution of the instructions of the motion evaluation system 400 by the processor 432 configures the eyewear device 100 to cooperate with the mobile device 401. The motion evaluation system 400 may utilize the memory 434 of the eyewear device 100 or the memory elements 540A, 540B, 540C of the mobile device 401 (FIG. 5). Also, the motion evaluation system 400 may utilize the processor elements 432, 422 of the eyewear device 100 or the central processing unit (CPU) 530 of the mobile device 401 (FIG. 5). In addition, the motion evaluation system 400 may further utilize the memory and processor elements of the server system 498. In this aspect, the memory and processing functions of the motion evaluation system 400 can be shared or distributed across the processors and memories of the eyewear device 100, the mobile device 401, and the server system 498.

In some implementations, the memory 434 includes or is coupled to a motion evaluation application 910, a localization system 915, an image processing system 920, a voice recognition module 925, and an animation engine 930.

In a motion evaluation system 400 in which an inertial measurement unit (IMU) 472 is capturing frames of motion data 902, the motion evaluation application 910 configures the processor 432 to detect motion (e.g., motion of the eyewear device 100 relative to a virtual target 710) and to present a virtual indicator 715, as described herein. In some implementations, in which a camera is capturing frames of video data 900, the motion evaluation application 910 configures the processor 432 to detect a human form (e.g., hand shapes, arm motion) and to present one or more virtual indicators 715, as described herein.

The localization system 915 configures the processor 432 to obtain localization data for use in determining the position of the eyewear device 100 relative to the physical environment. For example, the localization system 915 may access a series of motion data 902 captured by the IMU 472 to determine the eyewear device location 840 in three-dimensional coordinates relative to the physical environment (with or without reference to data from other sources, such as still images or video data). The localization data may be derived from a series of images captured by at least one camera 114A, from a series of motion data 902 captured by the IMU 472, from data gathered by a GPS unit 473, or a combination thereof.

The image processing system 920 configures the processor 432 to present virtual or graphical elements (e.g., virtual targets 710, virtual indicators 715, as described herein) on a display of an optical assembly 180A, 180B, in cooperation with the image display driver 442 and the image processor 412.

The voice recognition module 925 configures the processor 432 to perceive human speech, convert the received speech into frames of audio data 905, identify an inquiry based on the audio data 905, and assemble a response that is correlated to be responsive to the identified inquiry.

The animation engine 930 configures the processor 432 to render still images or animations (e.g., a punch animation 750, as described herein) for presentation on a display of an optical assembly 180A, 180B, in cooperation with the image display driver 442 and the image processor 412. Predefined and configurable images and animations are accessible over the network 495 and, in some implementations, are stored in the object data library 482 described herein.

FIG. 5 is a high-level functional block diagram of an example mobile device 401. Mobile device 401 includes a flash memory 540A which stores programming to be executed by the CPU 530 to perform all or a subset of the functions described herein.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580.

Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 591 for receiving input (by touch, multi-touch, or gesture, and the like, by hand, stylus, or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, Bluetooth™, or Wi-Fi. For example, short range XCVRs 520 may take the form of any available two-way wireless local area network (WLAN) transceiver of a type that is compatible with one or more standard protocols of communication implemented in wireless local area networks, such as one of the Wi-Fi standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, Wi-Fi, or Bluetooth™ based positioning systems can generate very accurate location coordinates, particularly when used in combination. Such location coordinates can be transmitted to the eyewear device over one or more network connections via XCVRs 510, 520.

The client device 401 in some examples includes a collection of motion-sensing components referred to as an inertial measurement unit (IMU) 572 for sensing the position, orientation, and motion of the client device 401. The motion-sensing components may be micro-electro-mechanical systems (MEMS) with microscopic moving parts, often small enough to be part of a microchip. The inertial measurement unit (IMU) 572 in some example configurations includes an accelerometer, a gyroscope, and a magnetometer. The accelerometer senses the linear acceleration of the client device 401 (including the acceleration due to gravity) relative to three orthogonal axes (x, y, z). The gyroscope senses the angular velocity of the client device 401 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the client device 401 relative to magnetic north.

The IMU 572 may include or cooperate with a digital motion processor or programming that gathers the raw data from the components and compute a number of useful values about the position, orientation, and motion of the client device 401. For example, the acceleration data gathered from the accelerometer can be integrated to obtain the velocity relative to each axis (x, y, z); and integrated again to obtain the position of the client device 401 (in linear coordinates, x, y, and z). The angular velocity data from the gyroscope can be integrated to obtain the position of the client device 401 (in spherical coordinates). The programming for computing these useful values may be stored in on or more memory elements 540A, 540B, 540C and executed by the CPU 540 of the client device 401.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU); shown as CPU 530 in FIG. 4. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 530, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 530 or processor hardware in smartphone, laptop computer, and tablet.

The CPU 530 serves as a programmable host controller for the mobile device 401 by configuring the mobile device 401 to perform various operations, for example, in accordance with instructions or programming executable by CPU 530. For example, such operations may include various general operations of the mobile device, as well as operations related to the programming for applications on the mobile device. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 530, e.g., as a working data processing memory. The flash memory 540A typically provides longer-term storage.

Hence, in the example of mobile device 401, the flash memory 540A is used to store programming or instructions for execution by the CPU 530. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device within the mapped environment, and determine a relative position of the eyewear device to one or more objects in the mapped environment. The processor 432 may construct the map and determine location and position information using a simultaneous localization and mapping (SLAM) algorithm applied to data received from one or more sensors. Sensor data includes images received from one or both of the cameras 114A, 114B, distance(s) received from a laser range finder, position information received from a GPS unit 473, motion and acceleration data received from an IMU 572, or a combination of data from such sensors, or from other sensors that provide data useful in determining positional information. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection. In a system that includes a high-definition (HD) video camera that captures video at a high frame rate (e.g., thirty frames per second), the SLAM algorithm updates the map and the location of objects at least as frequently as the frame rate; in other words, calculating and updating the mapping and localization thirty times per second.

Sensor data includes image(s) received from one or both cameras 114A, 114B, distance(s) received from a laser range finder, position information received from a GPS unit 473, motion and acceleration data received from an IMU 472, or a combination of data from such sensors, or from other sensors that provide data useful in determining positional information.

Figure 6:
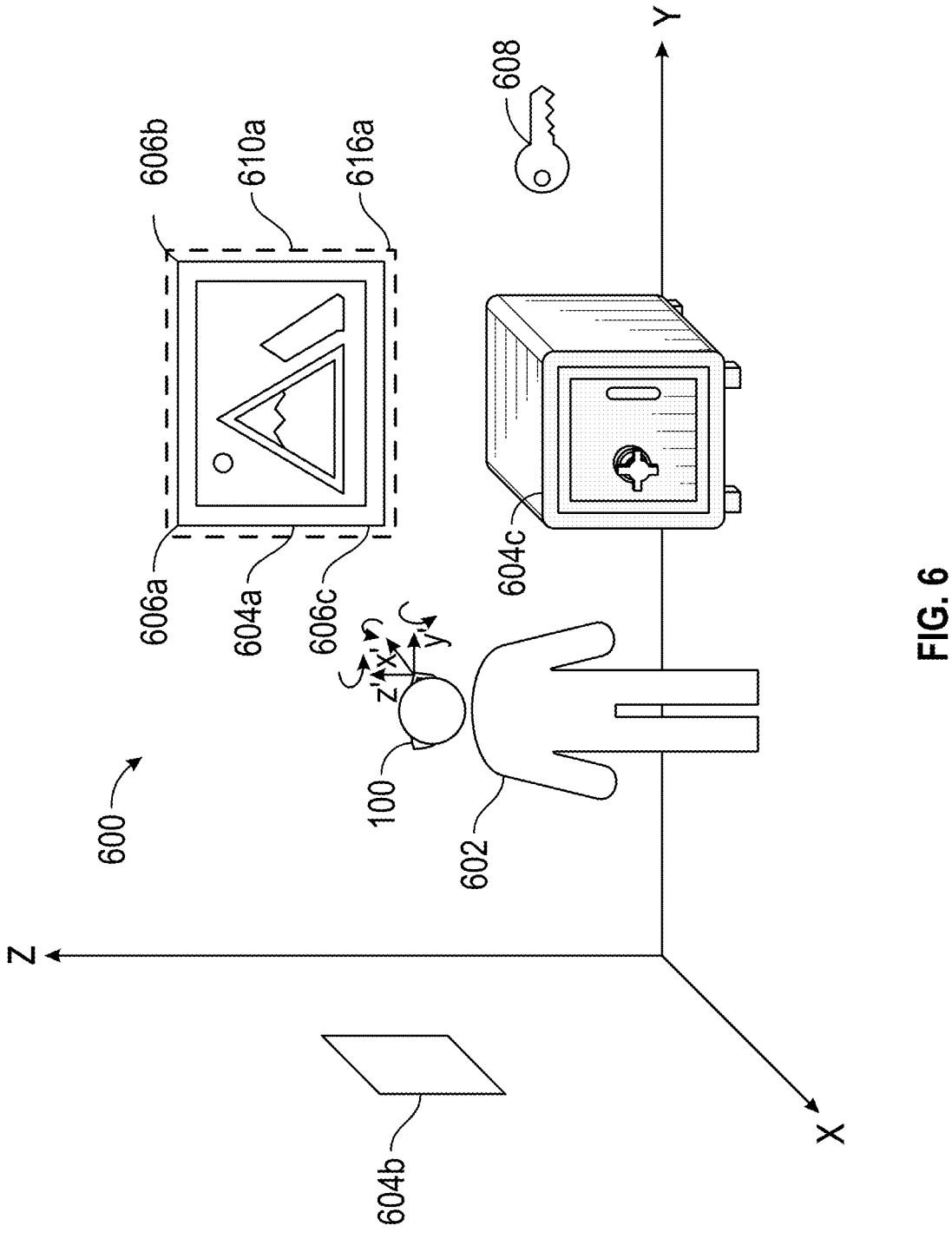
FIG. 6 is a schematic illustration of a user in an example environment for use in describing simultaneous localization and mapping.

FIG. 6 depicts an example physical environment 600 along with elements that are useful when using a SLAM application and other types of tracking applications (e.g., natural feature tracking (NFT), hand tracking). A user 602 of eyewear device 100 is present in an example physical environment 600 (which, in FIG. 6, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (roll, pitch, and yaw) of the eyewear device 100 within the environment by using two or more location points (e.g., three location points 606a, 606b, and 606c) associated with a single object 604a, or by using one or more location points 606 associated with two or more objects 604a, 604b, 604c. The processor 432 of the eyewear device 100 may position a virtual object 608 (such as the key shown in FIG. 6) within the environment 600 for viewing during an augmented reality experience.

The localization system 915 in some examples includes a virtual marker 610a associated with a virtual object 608 in the environment 600. In augmented reality, markers are registered at locations in the environment to assist devices with the task of tracking and updating the location of users, devices, and objects (virtual and physical) in a mapped environment. Markers are sometimes registered to a high-contrast physical object, such as the relatively dark object, such as the framed picture 604a, mounted on a lighter-colored wall, to assist cameras and other sensors with the task of detecting the marker. The markers may be preassigned or may be assigned by the eyewear device 100 upon entering the environment.

Markers can be encoded with or otherwise linked to information. A marker might include position information, a physical code (such as a bar code or a QR code; either visible to the user or hidden), or a combination thereof. A set of data associated with the marker is stored in the memory 434 of the eyewear device 100. The set of data includes information about the marker 610a, the marker's position (location and orientation), one or more virtual objects, or a combination thereof. The marker position may include three-dimensional coordinates for one or more marker landmarks 616a, such as the corner of the generally rectangular marker 610a shown in FIG. 6. The marker location may be expressed relative to real-world geographic coordinates, a system of marker coordinates, a position of the eyewear device 100, or other coordinate system. The one or more virtual objects associated with the marker 610a may include any of a variety of material, including still images, video, audio, tactile feedback, executable applications, interactive user interfaces and experiences, and combinations or sequences of such material. Any type of content capable of being stored in a memory and retrieved when the marker 610a is encountered or associated with an assigned marker may be classified as a virtual object in this context. The key 608 shown in FIG. 6, for example, is a virtual object displayed as a still image, either 2D or 3D, at a marker location.

In one example, the marker 610a may be registered in memory as being located near and associated with a physical object 604a (e.g., the framed work of art shown in FIG. 6). In another example, the marker may be registered in memory as being a particular position with respect to the eyewear device 100.

FIG. 8 is a flow chart 820 listing the steps in an example method of presenting an exercise experience 700 on the display 180B of an eyewear device 100. Although the steps are described with reference to the eyewear device 100 described herein, other implementations of the steps described, for other types of devices, will be understood by one of skill in the art from the description herein. One or more of the steps shown and described may be performed simultaneously, in a series, in an order other than shown and described, or in conjunction with additional steps. Some steps may be omitted or, in some applications, repeated.

The motion evaluation application 910 described herein, in some implementations, starts in response to receiving a selection through a user interface (e.g., selecting from a menu, pressing a button, using a touchpad) or through some other input means (e.g., hand gesture, finger motion, voice command). In other examples, the motion evaluation application 910 starts in response to detecting a body posture or motion (e.g., a repetitive motion 805, a traversing motion 806) as described herein.

Block 822 in FIG. 8 describes an example step of capturing frames a motion data 902 with the inertial measurement unit (IMU) 472 of an eyewear device 100. The eyewear device 100 in this example includes an IMU 472, at least one camera 114A, a display 180B, and a motion evaluation application 910. In some implementations, the process of capturing frames of motion data 902 is ongoing during active use of the eyewear device 100. In other examples, the process of capturing starts in response to receiving a selection through a user interface or through some other input means. The example method, at block 822, in some implementations, includes storing the captured frames of motion data 902 in memory 434 on the eyewear device 100, at least temporarily, such that the frames of data are available for analysis.

Block 824 describes an example step of presenting a virtual target 710 at a target position 712 relative to the display 180B. The target position 712 in some implementations is generally fixed so that it appears at the same position on the display 180B, without regard to the surrounding physical environment 600 or the motion of the eyewear device 100 through the environment. The virtual target 710 is presented as an overlay relative to the physical environment 600.

Block 826 describes an example step of locating the eyewear device 100 relative to the virtual target 710. After the virtual target 710 is presented at the target position 712, the eyewear device 100, of course, moves through the physical environment 600 and changes its location relative to the virtual target 710. The current eyewear device location 840 as described herein is determined using a process called localization.

The localization system 915 on the eyewear device 100 in some implementations configures the processor 432 on the eyewear 100 to obtain localization data based on the captured frames of motion data 902 gathered by the IMU 472. In some implementations, the localization system 915 constructs a virtual map of various elements within the camera field of view 904 using a SLAM algorithm, as described herein, updating the map and the location of objects at least as frequently as the IMU 472 captures motion data. In some implementations, the IMU 472 is capable of capturing motion data at very high sample rates (e.g., 100 hertz (samples per second), 720 Hz, 1024 Hz, 1344 Hz, 3200 Hz, or higher). Frequent measurements facilitate the detection and analysis of relatively subtle motions of the eyewear device 100 over time, relative to the virtual target 710.

The step of locating the eyewear device 100 relative to the virtual target 710 in some implementations includes calculating a correlation between the virtual target position 712 and the current eyewear location 840. The term correlation refers to and includes one or more vectors, matrices, formulas, or other mathematical expressions sufficient to define the three-dimensional distance between the virtual target position 712 and the current eyewear device location 840. The current eyewear device location 840, of course, is tied to or persistently associated with the display 180B which is supported by the frame of the eyewear device 100. In this aspect, the correlation performs the function of calibrating the motion of the eyewear 100 with the virtual target position 712. Because the localization process occurs continually and frequently, the correlation is calculated continually and frequently, resulting in accurate and near real-time tracking of the current eyewear location 840 relative to the virtual target position 712.

Block 828 describes an example step of presenting a virtual indicator 715 on the display 180B based on the current eyewear device location 840. In this aspect, the virtual indicator 715 moves in correlation with movements of the eyewear device 100. For example, if the eyewear device 100 moves generally up and down, the virtual indicator 715 (e.g., the virtual slider 715a shown in FIG. 7A) on the display 180B moves up and down. In general, the virtual indicator 715 includes one or more evaluation tools to inform the user or wearer of the eyewear device 100 about his or her posture or performance relative to one or more ideals or benchmarks.

Figure 7A:
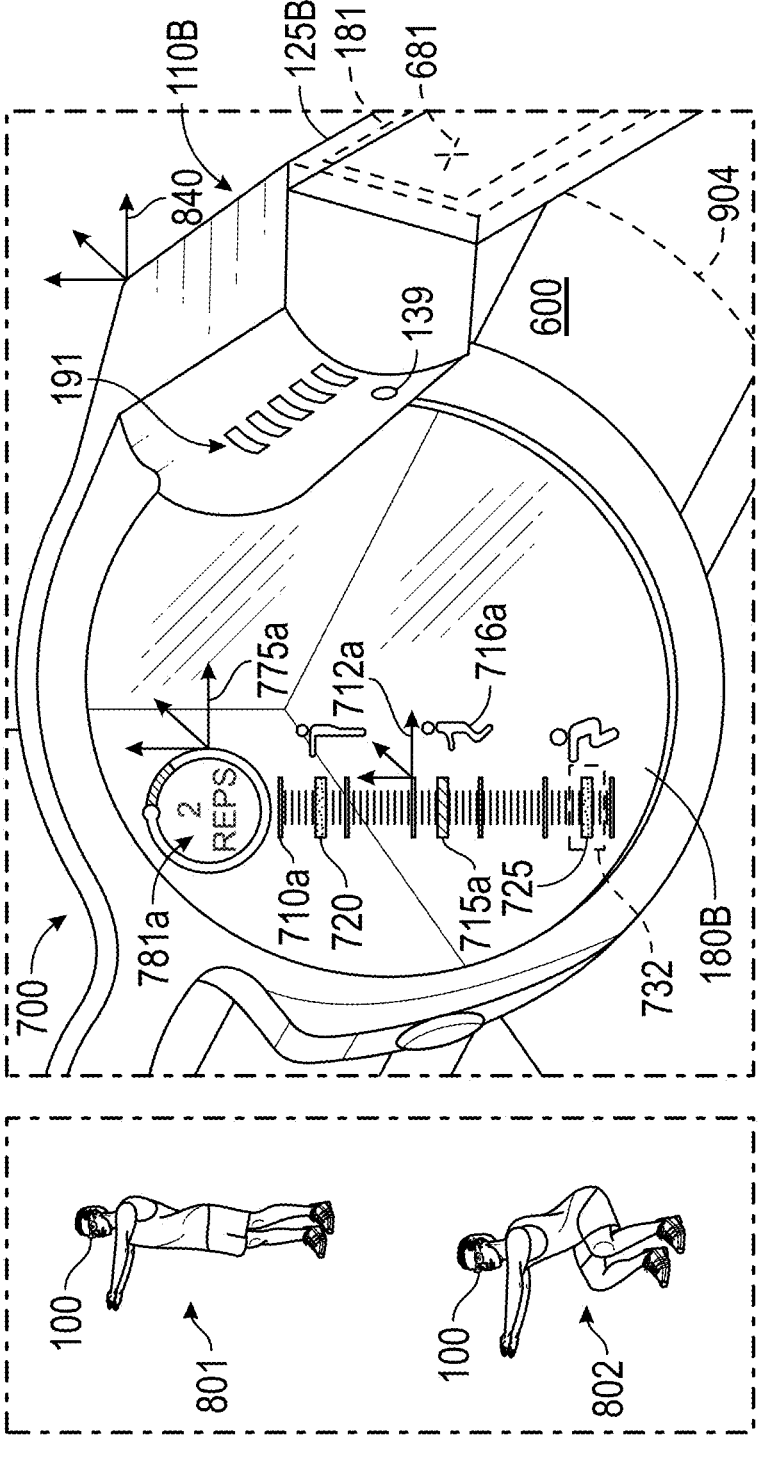
FIG. 7A is a perspective illustration of an example exercise experience with virtual targets arranged on a calibrated scale, as presented on a display.

FIG. 7A is a perspective illustration of an example exercise experience 700 in which the virtual target 710 comprises a graduated scale 710a and the virtual indicator 715 comprises a slider 715a which moves in correlation with movements of the eyewear device 100 (based on the current eyewear device location 840). As shown, the graduated scale 710a is presented at a scale location 712a relative to the display 180B. In some implementations, the virtual indicator 715 comprises a slider 715a and a graphical icon 716a which move together relative to the graduated scale 710a.

Figure 7B:
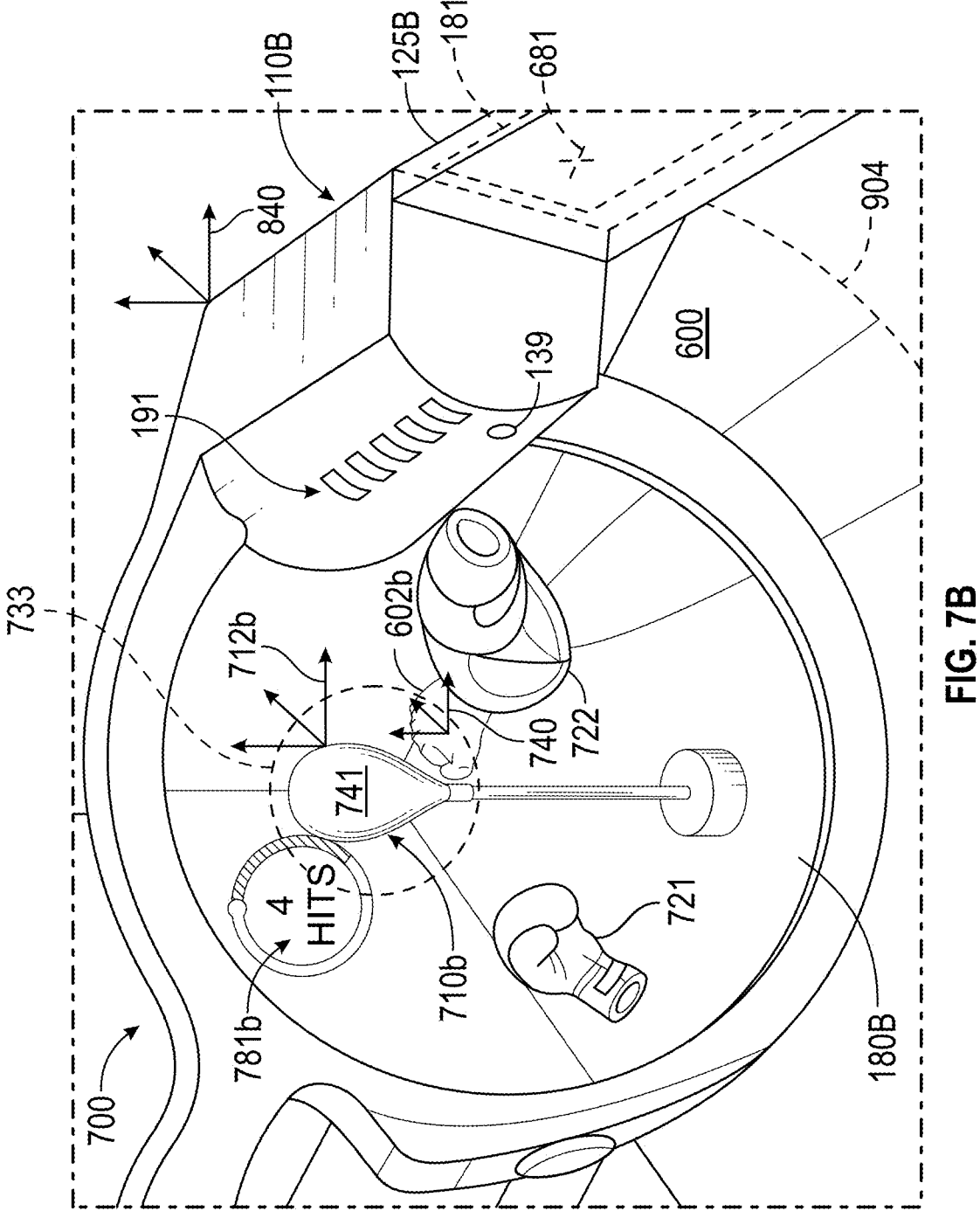
FIG. 7B is a perspective illustration of an example exercise experience with a virtual target and a responsive animation presented on a display.

FIG. 7B is a perspective illustration of another example exercise experience 700 in which the virtual target 710 comprises a punching bag 710b and the virtual indicator 715 comprises a neutral glove 721 and an active glove 722. The virtual gloves 721, 722 move in correlation with movements of the current eyewear device location 840 and, in some implementations, in correlation with movements of a detected hand shape 602b, as described herein.

Figure 7C:
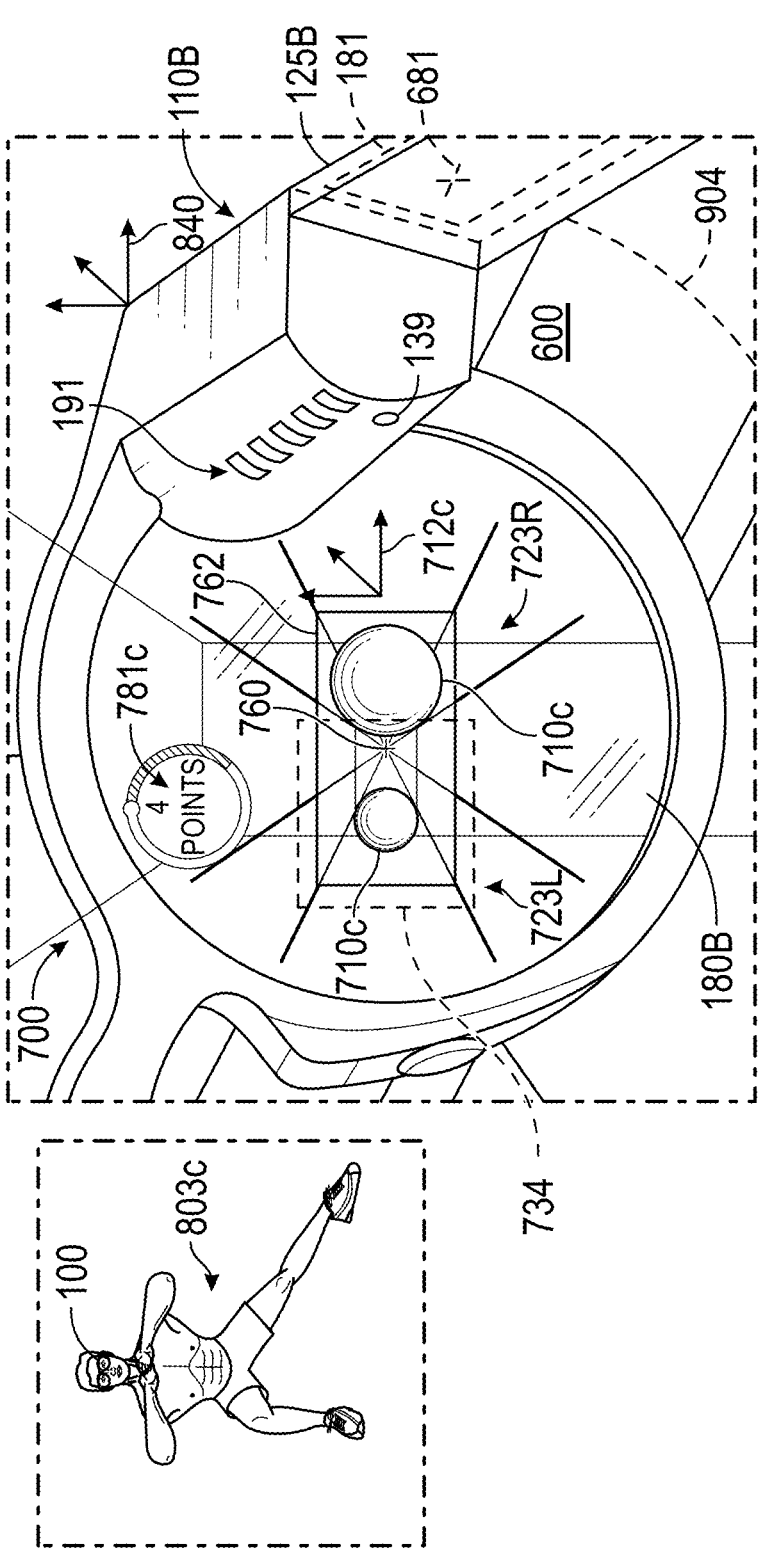
FIG. 7C is a perspective illustration of an example exercise experience with virtual moving targets presented on a display.

FIG. 7C is a perspective illustration of another example exercise experience 700 in which the virtual target 710 comprises one or more virtual orbs 710c and the virtual indicator 715 comprises a response (e.g., a visible change, audible sound, or tactile vibration) when the current eyewear device location 840 is detected within a proximity 734 of one of the orbs 710c, as described herein.

Figure 7D:
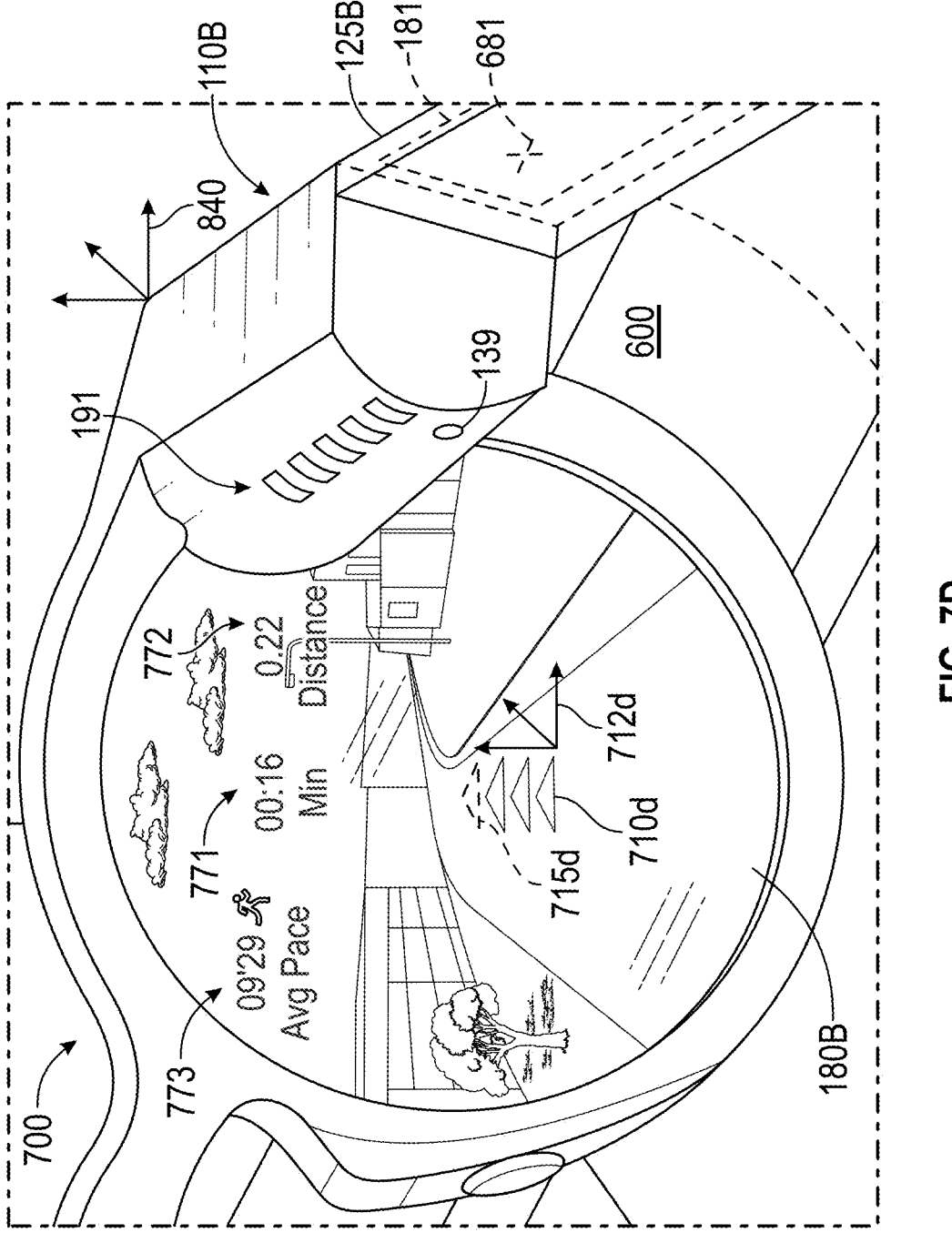
FIG. 7D is a perspective illustration of an example exercise experience with a virtual target and session information presented on a display.

FIG. 7D is a perspective illustration of another example exercise experience 700 in which the virtual target 710 comprises one or more guidance icons 710d and the virtual indicator 715 comprises at least one additional guidance icon 715d presented on the display 180B in accordance with the detected motion of the current eyewear device location 840.

Block 830 describes an example step of detecting and setting one or more limits relative to a virtual target 710, wherein each limit is associated with a particular posture or pose performed by the wearer of the eyewear device 100. The process of detecting in some implementations is based on the captured frames of motion data 902 from the IMU 472. For example, in FIG. 7A, the inset view on the left shows the wearer of an eyewear device 100 in a neutral posture 801 (e.g., standing) and in an active posture 802 (e.g., squatting). The process of detecting in some implementations includes detecting a first limit 720 based on the eyewear device location 840 associated with the neutral posture 801 (e.g., the three-dimensional eyewear device location 840 captured when the wearer is standing upright, in the neutral posture 801). In this aspect, the first limit 720 represents the neutral posture 801. As shown in FIG. 7A, the first limit 720 is presented on the display 180B as a bar-shaped icon near the top of the graduated scale 710a.

Similarly, the process of detecting in some implementations further includes detecting a second limit 725 based on the eyewear device location 840 associated with the active posture 802 (e.g., the three-dimensional eyewear device location 840 captured when the wearer is in a full squat, the active posture 802). In this aspect, the second limit 725 represents the active posture 802. As shown in FIG. 7A, the second limit 725 is presented on the display 180B as a bar-shaped icon near the bottom of the graduated scale 710a.

In another aspect, the example step at block 830 of detecting and setting one or more limits includes calibrating the graduated scale 710a according to the first and second limits 720, 725 and the size and shape of the display 180B. As shown in FIG. 7A, the graduated scale 710a occupies a particular space on the display 180B. The graduated scale 710a is calibrated so that the first and second limits 720, 725 will appear within the viewable space. For example, the upper or first limit 720 may be set near the top of the graduated scale 710a. Then, based on the detected lower or second limit 725 (and the space available on the display 180B) the units of measurement on the graduated scale 710a are calibrated so that the second limit 725 will be set near the bottom of the graduated scale 710a. In this aspect, the graduated scale 710a when calibrated may include a view of both limits 720, 725 for any of a range of different squat depths. For example, the eyewear device location 840 may change by thirty inches or more for a relatively tall wearer, compared to a change of twenty inches or less for a relatively short wearer.

In some implementations, the example step at block 830 of detecting and setting one or more limits 720, 725 includes a guided tutorial with instructions and at least one input element 491 for receiving a selection. In this example, the motion evaluation application 910 is configured to present a message (e.g., a text message on the display 180B, an audio command through the loudspeaker 191) instructing the wearer to perform the neutral posture 801 (e.g., "Stand upright now."). The motion evaluation application 910 in this example is further configured to detect a selecting action via one of the input elements 491 on the eyewear device 100. For example, the selecting action may include pushing a button switch on the eyewear device 100, tapping 681 a touchpad 181, speaking a phrase into the microphone 139, or performing a predefined and configurable hand gesture within the field of view 904 of the camera 114A. In response, the motion evaluation application 910 may be configured to emit a response indicating the selection has been received (e.g., play a sound, speak a message (e.g., "Standing height set"), initiate a tactile vibration).

Similarly, the motion evaluation application 910 may be configured to present a subsequent message (e.g., a text message, an audio command) instructing the wearer to perform the active posture 802 (e.g., "Squat to full depth now"), detect a selecting action (e.g., a button push, a tap, a spoken phrase), and emit a response (e.g., "Squat depth set").

Although this example describes the exercise of performing squats, the processes and the detection of limits are equally applicable to other types of motion or exercise, especially those in which the eyewear device 100 would move in a repetitive motion from one extreme to another (e.g., lunges, chin-ups, push-ups, box jumps, dead lifts). Moreover, although these examples describe a repetitive motion that is generally vertical (e.g., up and down), the processes and the detection of limits are equally applicable to other motions and exercise in which the repetitive motion is generally horizontal (e.g., lateral, side to side) or angular (e.g., from lower left to upper right) or a combination of multiple motions (e.g., a lateral motion followed by a vertical motion).

Block 832 describes an example step of presenting on the display 180B the graduated scale 710a (as calibrated), the first limit 720, the second limit 725, and the virtual indicator 715 (e.g., the slider 715a and graphical icon 716a). In some implementations, the graphical icon 716a comprises a series of stick figures or other exemplary body shapes to illustrate the desired postures associated with a particular exercise. For example, as shown in FIG. 7A, the graphical icon 716a is presented in a standing position when the slider 715a is near the upper or first limit 720, in a full squat when the slider 715a is near the lower or second limit 725, and in an intermediate squatting posture when the slider 715a is presented at an intermediate position along the calibrated, graduated scale 710a. The graphical icon 716a in some implementations includes a series of intermediate postures representing one or more benchmarks for a particular exercise.

Block 834 describes an example step of detecting a repetitive motion 805 of the eyewear device 100 based on the captured frames of motion data 902 (e.g., captured by the IMU 472 of the eyewear device 100) and incrementing a current repetition count 781. During operation and use by a wearer, the motion of the eyewear device 100, of course, approximates the motion of the wearer. For example, when the wearer engages in calisthenics (e.g., squats, lunges, sparring, jogging, jumping jacks, push-ups), the IMU 472 registers and approximates the motion of the wearer. High IMU sample rates facilitate the detection and analysis of repetitive motions 805 over time. The process of detecting a repetitive motion 805 in some implementations includes detecting a current eyewear position 840, as shown in FIGS. 7A through 7D, in three-dimensional coordinates relative to one or more elements of the physical environment 600.

As used herein, a repetition refers to and includes a movement that is repeated, especially a single cycle or sequence of moving away followed by returning (e.g., moving a body part between positions, raising and lowering a weight). A repetition typically begins at a first position, includes movement to a second position, may include a pause, and then includes a returning movement back toward the first position. A repetition relative to parts of the body may involve flexion and extension, abduction and adduction, medial and lateral rotation, elevation and depression, pronation and supination, dorsiflexion and plantarflexion, inversion and eversion, opposition and reposition, protraction and retraction, circumduction through an angular distance, and the like.

The process of detecting a repetitive motion 805 includes analyzing the frames of motion data 902 captured by the IMU 472 (e.g., position, acceleration, angular velocity) and determining whether the detected motion is repetitive in nature. In this aspect, the process includes detecting the eyewear device location 840, in sequential order, near a first position, moving toward and near a second position, and then returning near the first position. In the context of the squat example shown in FIG. 7A, the process of detecting a repetitive motion 805 includes detecting the eyewear device location 840, in sequential order, at or near the first limit 720, in motion toward and at or near the second limit 725, and then in a returning motion at or near the first limit 720 again.

To accommodate for variations in user motion and the eyewear location 840 relative to the precise limits, the first and second limits 720, 725 in some implementations include a predefined and configurable proximity associated with each limit. For example, as shown in FIG. 7A, the second limit 725 is defined to include a second proximity 732 which is depicted as a rectangular area in the figure, but in some implementations is defined as a three-dimensional polyhedron. Similarly, the first limit 720 is defined to include a first proximity 731 (not shown). Each proximity in some implementations is set to a predefined value (e.g., a certain distance, a percentage deviation in one or more orthogonal directions) relative to the established limit, and is configurable (e.g., editable through a user interface). In some implementations, the proximity value varies according to the detected motion and variability of the eyewear location 840.

When a proximity is associated with each limit, and in the context of the squat example shown in FIG. 7A, the process of detecting a repetitive motion 805 includes detecting the eyewear device location 840, in sequential order, within a first proximity 731 of the first limit 720, within a second proximity 732 of the second limit 725, and then within the first proximity 731 of the first limit 720 again.

In the context of the punching bag example shown in FIG. 7B, the punching bag location 712*b* is defined to include a proximity 733 which is depicted as a circle in the figure, but in some implementations is defined as a three-dimensional sphere.

In the context of the side lunge example shown in FIG. 7C, the left lane 723L is defined to include an orb proximity 734 which is depicted as a depicted as a rectangular area in the figure, but in some implementations is defined as a three-dimensional polyhedron. Similarly, the right lane 723R is defined to include its own orb proximity. The orb proximity in some implementations is defined to at least partly surround or coincide with the scoring plane 762, which is presented on the display 180B at a scoring plane position 712*c*.

The example step at block 834 also includes incrementing a current repetition count 781 in response to detecting a repetitive motion 805. In some implementations, the current rep count 781 is incremented only if a complete repetitive motion 805 is detected.

In some implementations, the process of incrementing a current repetition count 781 includes analyzing and recording the detection motions (e.g., the attempted repetitions) and generating a report that includes information for the wearer of the eyewear device 100 about his or her posture or performance relative to one or more ideals or benchmarks.

In the context of the squat example shown in FIG. 7A, a repetitive motion 805 is complete when it includes detecting the eyewear device location 840, in sequential order, within a first proximity 731 of the first limit 720, within a second proximity 732 of the second limit 725, and then within the first proximity 731 of the first limit 720 again. In some implementations, any device location 840 detected outside of the associated proximity will not count as a repetition; in other words, the current repetition count 781*a* will not increase. As shown, the current repetition count 781*a* is presented on the display at an information position 775*a* and in some implementations includes one or more relevant words (e.g., REPS) and a graphical element (e.g., the shaded portion of the circular scale indicates progress toward a goal (e.g., a total of ten repetitions).

In the context of the punching bag example shown in FIG. 7B, the current punch count 781*b* is presented on the display and in some implementations includes one or more relevant words (e.g., HITS) and a graphical element (e.g., the shaded portion of the circular scale indicates progress toward a goal (e.g., a total of ten bag strikes).

In the context of the side lunge example shown in FIG. 7C, the current orb count 781*c* is presented on the display and in some implementations includes one or more relevant words (e.g., POINTS) and a graphical element (e.g., the shaded portion of the circular scale indicates progress toward a goal (e.g., a total of ten points).

Block 836 describes an example step of detecting a hand shape 602*b* in the captured frames of video data 900 captured by at least one camera 114A of the eyewear device 100. In this example step, the hand shape 602*b* (as shown in FIG. 7B) is detected at a hand position 740 relative to the eyewear device location 840.

In some implementations, the high-speed processor 432 of the eyewear device 100 stores the captured frames of video data 900 with at least one camera 114A as the wearer moves through a physical environment 600. As described herein and shown in FIG. 7A, the camera 114A typically has a camera field of view 904 that captures images and video beyond the limits of the display 180B. The camera system, in some implementations, includes one or more high-resolution, digital cameras equipped with a CMOS image sensor capable of capturing high-definition still images and high-definition video at relatively high frame rates (e.g., thirty frames per second or more). Each frame of digital video includes depth information for a plurality of pixels in the image. In this aspect, the camera system serves as a high-definition scanner by capturing a detailed input image of the physical environment. The camera in some implementations includes a pair of high-resolution digital cameras 114A, 114B coupled to the eyewear device 100 and spaced apart to acquire a left-camera raw image and a right-camera raw image, as described herein. When combined, the raw images form an input image that includes a matrix of three-dimensional pixel locations. The example method, at block 836, in some implementations, includes storing the captured frames of video data 900 in memory 434 on the eyewear device 100, at least temporarily, such that the frames are available for analysis.

In the context of the punching bag example shown in FIG. 7B, the motion evaluation application 910 includes a hand detection utility to analyze the captured frames of video data 900 and detect hand shapes and hand motions over time. The hand detection utility, in some implementations, identifies a set of hand landmarks based on the pixel-level depth information contained in the captured frames of video data 900. The set of hand landmarks, for example, may include three-dimensional coordinates for as many as all fifteen of the interphalangeal joints, the five fingertips, and the wrist at its articulation points, as well as other skeletal and soft-tissue landmarks.

Those skilled in the art will understand that the process of detecting and tracking includes detecting the hand, over time, in various postures, in a set or series of captured frames of video data 900. In this context, the detecting process at block 836 refers to and includes detecting a hand in as few as one frame of video data, as well as detecting the hand, over time, in a subset or series of frames of video data. Accordingly, in some implementations, the process at block 836 includes detecting a hand shape 602*b* in a particular posture in one or more of the captured frames of video data 900. In other implementations, the process at block 836 includes detecting the hand, over time, in various shapes or postures, in a subset or series of captured frames of video data 900.

In some implementations, the process of detecting the hand shape 602b includes identifying a hand position 740 in at least two dimensions relative to the current eyewear device location 840. The detection of the hand position 740 relative to the eyewear device location 840, of course, also permits detection of the hand position 740 relative to the display 180B and/or other objects having a known position (e.g., the punching bag 710b presented at bag position 712b).

Block 838 describes an example step of detecting an intersecting posture 803b between the detected hand position 740 and a virtual target 710 (e.g., the punching bag 710b) and, in turn, incrementing a current punch count 781b. As shown in FIG. 7B, the intersecting posture 803b is characterized by the detected hand position 740 within a bag proximity 733 of the virtual punching bag 710b. In this example, in use, the punching bag 710b is presented at a known bag location 712b relative to the display 180B. The current eyewear device location 840 is continually detected and updated based on the IMU data. The hand position 740 relative to the eyewear device location 840 is detected in the example step at block 836. With these data points established, the motion evaluation application 910 detects and continually updates the current hand position 740 relative to the punching bag position 712b and thereby determines whether the hand position 740 and bag position 712b are detected in an intersecting posture 803b.

In some implementations, the process of detecting an intersecting posture 803b is based on the frames of motion data 902 captured by the IMU 472, or on the frames of video data 900 captured by the camera 114A, or on a combination of both.

The example step at block 838 also includes incrementing a current punch count 781b in response to detecting an intersecting posture 803b. As shown, the punch count 781b in some implementations includes one or more relevant words (e.g., HITS) and a graphical element (e.g., the shaded portion of the circular scale indicates progress toward a goal (e.g., a total of ten bag strikes).

Block 850 describes an example step of presenting a virtual indicator 715 on the display 180B in response to detecting an intersecting posture 803b. In some implementations, the virtual indicator 715 includes a neutral glove 721 and an active glove 722, as shown in FIG. 7B. The neutral glove 721 is shown on the left, illustrated in a relaxed position. The active glove 722 on the right is shown in a forward, active and punching position. In this example, in response to detecting an intersecting posture 803b, the active glove 722 is presented on the display 180B near the bag position 712b. In this aspect, when a hand shape 602b is detected near the bag 710b, the active glove 722 is presented on the display 180B to provide a visual cue that an intersecting posture 803b has been detected.

In some implementations, the process of presenting a virtual indicator 715 in response to detecting an intersecting posture 803b includes presenting a punch animation 750 on the display 180B. The punch animation 750 in some implementations includes presenting the neutral glove 721 followed by the active glove 722, as described above. The punch animation 750, in some implementations, also includes presenting the virtual target 710 (e.g., punching bag 710b) as a neutral bag 741 and an active bag 742. As shown in FIG. 7B, an example neutral bag 741 is illustrated in a neutral, upright, and apparently still orientation. An active bag 742 (not shown) in some implementations is illustrated in a rearward, deflected orientation and in apparent motion relative to the neutral bag 741, thereby illustrating the bag 710b in response to being struck. The punch animation 750 in some implementations is controlled and driven by an animation engine 930 in cooperation with the image display driver 442 and an image processor 412 of the eyewear device 100.

In some implementations, the punch animation 750 includes presenting the active bag 742 in close correlation (e.g., in time and position) with the active glove 722, thereby illustrating a successful hit of the bag 710b. In this example, the process of presenting the punch animation 750, in response to the detected intersecting posture 803b, includes, in sequential order: (1) advance the virtual glove by presenting the active glove 722 near the bag position 712b (e.g., for a predefined and configurable punch duration); (2) show the bag strike by presenting the active bag 742 (e.g., for the same punch duration) at a position apparently beyond the bag position 712b relative to the eyewear device location 840; (3) withdrawing the virtual glove by presenting the neutral glove 721 at a position apparently closer to the eyewear device location 840 relative to the bag position 712b; and (4) return the bag to rest by presenting the neutral bag 741 at the bag position 712b. In some implementations, the punch animation 750 includes a number of intermediate gloves and bags which are illustrated in intermediate shapes or postures and presented at intermediate positions between neutral and active.

Block 852 describes an example step of presenting on the display 180B a virtual target 710 that includes a distal position 760, a scoring plane 762, and one or more orbs 710c selectively presented on the display 180B either on the left side or right side relative to the distal position 760, as illustrated in FIG. 7C.

In this example, the scoring plane 762 is presented at a known scoring plane location 712c relative to the display 180B. The current eyewear device location 840 is continually detected and updated based on the IMU data. The eyewear device location 840 moves left and right as the wearer of the eyewear device 100, shown in the inset view in an orb intersecting posture 803c as described herein, moves left and right (e.g., performing lateral lunges, left and right).

In some implementations, the one or more orbs 710c are selectively presented at or near the scoring plane 762. In response, the wearer of the eyewear device 100 moves left or right in an attempt to perform an orb intersecting posture 803c relative to the orb 710c. In some implementations, the orbs 710c are apparently moving from the distal position 760 toward the scoring plane 762, as described herein. In some implementations, the orbs 710c are characterized as either good or bad (e.g., using different colors, textures) and, in response, the wearer of the eyewear device 100 moves left or right in an attempt to intersect the good orbs or avoid the bad orbs, as described herein.

Block 854 describes an example step of detecting an orb intersecting posture 803c between the current eyewear device location 840 and a virtual target 710 (e.g., an orb 710c) at or near the scoring plane 762 and in turn, incrementing a current orb count 781c. As shown in FIG. 7C, the orb intersecting posture 803c is characterized by detecting the current eyewear device location 840 with an orb proximity 734 of at least one of the orbs 710c, and the scoring plane 762. In some implementations, the process of detecting an orb intersecting posture 803c evaluates the eyewear device location 840 when at least one of the orbs 710c is at or nearly coincident with the scoring plane 762.

In the context of the lateral lunge example shown in FIG. 7C, the virtual target 710 in one aspect defines a field of play.

The field of play includes the distal position 760 and the scoring plane 762 presented at a scoring plane location 712c. The scoring plane 762 in some implementations is divided into a virtual left lane 723L and a virtual right lane 723R. The field of play in some implementations includes one or more perspective lines, as shown in FIG. 7C, extending along at least a portion of the virtual lanes 723L, 723R. As the wearer of the eyewear device 100 moves left and right, the current eyewear device location 840 moves left and right, relative to all the elements presented on the field of play. The motion evaluation application 910 detects and continually updates the eyewear device location 840, based on the IMU data (e.g., in some implementations, without reference to image data 900 captured by the camera 114A). This relative motion allows the wearer to sense where he is relative to the field of play.

The example step at block 854 also includes incrementing a current orb count 781c in response to detecting an orb intersecting posture 803c. As shown, the punch count 781c in some implementations includes one or more relevant words (e.g., POINTS) and a graphical element (e.g., the shaded portion of the circular scale indicates progress toward a goal (e.g., a total of ten points). In one aspect, an incremental change in the current orb count 781c serves as a virtual indicator 715 (e.g., indicating a successful intersection).

In some implementations, the example step at block 854 also includes presenting a virtual indicator 715 on the display 180B in response to detecting the orb intersecting posture 803c. In some implementations, the virtual indicator 715 includes a visible change in the intersected orb (e.g., a color change, an animated burst, a disappearance), a sound played through the loudspeaker 191 (e.g., a beep, a popping sound), a tactile vibration of the eyewear device 100, or combinations of one or more such indicators.

In some implementations, the motion evaluation application 910 presents the one or more orbs 710c in apparent motion from the distal position 760 toward the scoring plane 762 by, for example, presenting the orbs 710c in shapes and sizes which vary according to the relative distance between the distal position 760 and the scoring plane 762. For example, as shown in FIG. 7B, the orb 710c approaching in the left lane 723L is relatively small, indicating it is relatively closer to the distal position 760. The orb 710c approaching in the right lane 723R is relatively larger, occupying nearly all of the right half the scoring plane 762, indicating it is relatively close to the scoring plane 762 (e.g., where the intersection must occur). In some implementations, the orb 710c approach in the same lane persistently (e.g., along the entire lane, from the distal position 760 to the scoring plane 762). In other implementations, the orbs 710c change lanes (e.g., from left 723L to right 723R, and back) as they apparently move toward the scoring plane 762. In some implementations, the apparent motion of the orbs 710c is controlled and driven by the animation engine 930 in cooperation with the image display driver 442 and an image processor 412 of the eyewear device 100.

In some implementations, the orbs 710c are characterized as either good or bad (e.g., using different colors, textures) and, in response, the wearer of the eyewear device 100 moves left or right in an attempt to intersect the good orbs and avoid the bad orbs. In this example, the step of detecting the orb intersecting posture 803c includes detecting a good-orb intersecting posture (e.g., the current eyewear location 840 detected within the proximity at least one of the good orbs 710c at the scoring plane 762) and detecting a bad-orb avoiding posture (e.g., the current eyewear location 840 detected outside the proximity of at least one of the bad orbs 710c at the scoring plane 762). In some implementations, the current orb count 781c increases in response to detecting either a detected good-orb intersecting posture or a bad-orb avoiding posture.

In the context of the orbs 710c in apparent motion toward the scoring plane 762, the orbs 710c in some implementations are characterized as either good or bad persistently (e.g., along the entire lane, from the distal position 760 to the scoring plane 762). In other implementations, the orbs 710c may change their character (e.g., from good to bad, and back) as they apparently move toward the scoring plane 762.

Block 856 describes an example step of presenting on the display 180B a virtual target 710 that includes one or more guidance icons 710d. In use, the guidance icons 710d offer guidance to the wearer of an eyewear device 100 engaged in any of a variety of traversing motions (e.g., walking, running, cycling, skiing, driving) along a predefined and configurable course, or along no particular course.

As shown in FIG. 7D, the guidance icons 710d are presented at an icon position 712d relative to the physical environment 600. In some implementations, the icon position 712d is persistently correlated with the physical environment 600, such that the one or more guidance icons 710d are presented on the display 180B at a position that is apparently fixed relative to the physical environment 600. For example, the guidance icons 710d shown in FIG. 7D will be apparently fixed at a location on the road, ahead of the wearer, without regard to the current eyewear location 840. In other implementations, the icon position 712d is persistently correlated with the display 180B, such that the one or more guidance icons 710d always appear at the same relative position on the display 180B (e.g., near the center), without regard to the physical environment 600.

The process of presenting the one or more guidance icons 710d, in some implementations, includes presenting information on the display 180B, including but not limited to an elapsed time 771, an elapsed distance 772, a current pace 773, or combinations thereof.

Block 858 describes an example step of detecting a traversing motion 806 of the eyewear device 100 based on the captured frames of motion data 902 (e.g., captured by the IMU 472 of the eyewear device 100) and presenting a virtual indicator 715 comprising at least one additional guidance icon 715d, as shown in FIG. 7D. During operation and use by a wearer, the motion of the eyewear device 100, of course, approximates the motion of the wearer. For example, when the wearer engages in a traversing motion (e.g., walking, running, cycling, skiing, driving), the IMU 472 registers and approximates the motion of the wearer. High IMU sample rates facilitate the detection and analysis of traversing motions 806 over time.

As used herein, a traversing motion 806 refers to and includes a movement that is primarily in translation (as opposed to rotation), especially a forward movement. The process of detecting a traversing motion 806 includes analyzing the frames of motion data 902 captured by the IMU 472 (e.g., position, acceleration, angular velocity) and determining whether the detected motion is primarily in translation.

The process of presenting least one additional guidance icon 715d in some implementations is based on the detected traversing motion 806 of the eyewear device 100, such that the additional guidance icon 715d is presented at a location that is correlated with the motion 806 of the eyewear device 100. In this aspect, the additional guidance icon 715d may or may not be presented near the original set of one or more guidance icons 710*d*. The process of presenting least one additional guidance icon 715*d* in some implementations includes ceasing to present (e.g., erasing) one or more of the guidance icons 710*d*. In this aspect, the additional guidance icons 715*d* may be presented in an ongoing sequential trail, ahead of the wearer, at an apparent location that is correlated with the ongoing motion 806 of the eyewear device 100.

Although the various systems and methods are described herein with reference to fitness, exercises, and exercise equipment, the technology described may be applied to detecting any type of experience or activity involving motion which occurs in a physical environment, retrieving data about the detected activity, and presenting one or more virtual evaluation tools, teaching, or other guidance on a display.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating system. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method of presenting an exercise experience, comprising:

capturing frames of motion data with an inertial measurement unit coupled to an eyewear device, wherein the eyewear device further comprises a display and an eyewear device location;

detecting, based on the frames of motion data, a repetitive motion of the eyewear device relative to a physical environment;

presenting on the display a virtual target at a target position relative to the physical environment and as an overlay relative to the physical environment, wherein the target position comprises a distal position and a scoring plane position, and wherein the virtual target comprises a virtual orb in apparent motion along a virtual path unrelated to the eyewear device location, and wherein the virtual path extends from the distal position toward the scoring plane position;

estimating the eyewear device location relative to the virtual target based on the frames of motion data;

detecting, based on the frames of motion data, an orb intersecting posture characterized by the eyewear device location within an orb proximity of the virtual orb and the scoring plane position; and presenting on the display a virtual indicator in response to the orb intersecting posture, wherein the virtual indicator is a response comprising one or more of a visible change in an intersected orb, a sound played through a loudspeaker, a tactile vibration of the eyewear device, and an incremental increase in a current orb count.

2. The method of claim 1, wherein presenting the virtual target further comprises:

defining the distal position relative to the physical environment, independent of the eyewear device location;

defining the scoring plane position relative to the display, independent of the eyewear device location; and presenting on the display a scoring plane associated with the scoring plane position, wherein the scoring plane comprises a bordered shape.

3. The method of claim 1, wherein detecting the orb intersecting posture further comprises:

estimating a virtual orb location along the virtual path relative to the scoring plane position; and detecting the orb intersecting posture when the virtual orb location is nearly coincident with the scoring plane position.

4. The method of claim 1, wherein the virtual target comprises one or more virtual orbs in apparent motion along one or more virtual paths, each unrelated to the eyewear device location, from the distal position toward the scoring plane position, wherein detecting the orb intersecting posture comprises detecting the eyewear device location within the orb proximity associated with any of the one or more virtual orbs and the scoring plane position, and wherein presenting the virtual indicator comprises presenting the current orb count at an information position relative to the display.

5. The method of claim 1, wherein presenting the virtual target further comprises:

presenting the virtual orb in apparent motion along either a left virtual path or a right virtual path, selectively, wherein each of the left virtual path and the right virtual path is unrelated to the eyewear device location, such that the virtual orb in apparent motion facilitates a lateral exercise experience, wherein the repetitive motion of the eyewear device relative to the physical environment is primarily lateral; and selectively changing the virtual orb from the left virtual path to the right virtual path in accordance with the apparent motion from the distal position toward the scoring plane position.

6. The method of claim 1, wherein detecting the orb intersecting posture further comprises:

establishing the orb proximity relative to the scoring plane position, wherein the orb proximity comprises a region selected from a shape consisting of a two-dimensional area and a three-dimensional polyhedron.

7. The method of claim 1, wherein presenting the virtual target further comprises:

sizing the virtual orb relative to the virtual path, such that the virtual orb appears progressively larger in accordance with the apparent motion from the distal position toward the scoring plane position; and presenting one or more perspective lines extending along at least a portion of the virtual path.

8. The method of claim 1, wherein the virtual target comprises a good virtual orb and a bad virtual orb, wherein presenting the virtual target further comprises selectively changing the good virtual orb into the bad virtual orb during the apparent motion, and wherein detecting the orb intersecting posture further comprises:

detecting whether the eyewear device location is within the orb proximity of the good virtual orb and the scoring plane position, and in response incrementing the current orb count by one; and detecting whether the eyewear device location is outside the orb proximity of the bad virtual orb and the scoring plane position, and in response incrementing the current orb count by one.

9. A system comprising:

an eyewear device comprising a processor, a memory, a display, and an inertial measurement unit;

programming in the memory, wherein execution of the programming by the processor configures the eyewear device to perform functions, including functions to:

capture frames of motion data with an inertial measurement unit coupled to an eyewear device, wherein the eyewear device further comprises a display and an eyewear vice location;

detect, based on the frames of motion data, a repetitive motion of the eyewear device relative to a physical environment;

present on the display a virtual target at a target position relative to the physical environment and as an overlay relative to the physical environment, wherein the target position comprises a distal position and a scoring plane position, wherein the virtual target comprises a virtual orb in apparent motion along a virtual path unrelated to the eyewear device location, and wherein the virtual path extends from the distal position toward the scoring plane position;

estimate the eyewear device location relative to the virtual target based on the frames of motion data;

detect, based on the frames of motion data, an orb intersecting posture characterized by the eyewear device location within an orb proximity of the virtual orb and the scoring plane position; and present on the display a virtual indicator in response to the orb intersecting posture, wherein the virtual indicator is a response comprising one or more of a visible change in an intersected orb, a sound played through a loudspeaker, a tactile vibration of the eyewear device, and an incremental increase in a current orb count.

10. The system of claim 9, wherein the function to present the virtual target further comprises functions to:

define the distal position relative to the physical environment, independent of the eyewear device location;

define the scoring plane position relative to the display, independent of the eyewear device location; and present on the display a scoring plane associated with the scoring plane position, wherein the scoring plane comprises a bordered shape.

11. The system of claim 9, wherein the function to detect the orb intersecting posture further comprises functions to:

estimate a virtual orb location along the virtual path relative to the scoring plane position; and detect the orb intersecting posture when the virtual orb location is nearly coincident with the scoring plane position.

12. The system of claim 9, wherein the function to present the virtual target further comprises functions to:

present one or more virtual orbs in apparent motion along one or more virtual paths, each unrelated to the eyewear device location, from the distal position toward the scoring plane position, wherein the function to detect the orb intersecting posture comprises a function to detect the eyewear device location within the orb proximity associated with any of the one or more virtual orbs and the scoring plane position, and wherein the function to present the virtual indicator comprises a function to present the current orb count at an information position relative to the display.

13. The system of claim 9, wherein the function to present the virtual target further comprises functions to:

present the virtual orb in apparent motion along either a left virtual path or a right virtual path, selectively, wherein each of the left virtual path and the right virtual path is unrelated to the eyewear device location, such that the virtual orb in apparent motion facilitates a lateral exercise experience, wherein the repetitive motion of the eyewear device relative to the physical environment is primarily lateral;

selectively change the virtual orb from the left virtual path to the right virtual path in accordance with the apparent motion from the distal position toward the scoring plane position;

size the virtual orb relative to the virtual path, such that the virtual orb appears;

progressively larger in accordance with the apparent motion from the distal position toward the scoring plane position; and present one or more perspective lines extending along at least a portion of the virtual path.

14. The system of claim 9, wherein the virtual target comprises a good virtual orb and a bad virtual orb, wherein the function to present the virtual target further comprises functions to selectively change the good virtual orb into the bad virtual orb during the apparent motion, and wherein the function to detect the orb intersecting posture further comprises functions to:

detect whether the eyewear device location is within the orb proximity of the good virtual orb and the scoring plane position, and in response to increment the current orb count by one; and detect whether the eyewear device location is outside the orb proximity of the bad virtual orb and the scoring plane position, and in response to increment the current orb count by one.

15. A non-transitory computer-readable medium storing program code which, when executed, is operative to cause an electronic processor to perform the steps of:

capturing frames of motion data with an inertial measurement unit coupled to an eyewear device, the eyewear device further comprising a processor, a memory, a display, a loudspeaker, and an eyewear device location;

detecting, based on the frames of motion data, a repetitive motion of the eyewear device relative to a physical environment;

presenting on the display a virtual target at a target position relative to the physical environment and as an overlay relative to the physical environment, wherein the target position comprises a distal position and a scoring plane position, wherein the virtual target comprises a virtual orb in apparent motion along a virtual path unrelated to the eyewear device location, and wherein the virtual path extends from the distal position toward the scoring plane position;

estimating the eyewear device location relative to the virtual target based on the frames of motion data;

detecting, based on the frames of motion data, an orb intersecting posture characterized by the eyewear device location within an orb proximity of the virtual orb and the scoring plane position; and presenting on the display a virtual indicator in response to the orb intersecting posture, wherein the virtual indicator is a response comprising one or more of a visible change in an intersected orb, a sound played through the loudspeaker, a tactile vibration of the eyewear device, and an incremental increase in a current orb count.

16. The non-transitory computer-readable medium storing program code of claim 15, wherein the program code when executed is operative to cause the electronic processor to perform the further steps of:

defining the distal position relative to the physical environment independent of the eyewear device location;

defining the scoring plane position relative to the display, independent of the eyewear device location;

presenting on the display a scoring plane associated with the scoring plane position, wherein the scoring plane comprises a bordered shape;

estimating a virtual orb location along the virtual path relative to the scoring plane position; and detecting the orb intersecting posture when the virtual orb location is nearly coincident with the scoring plane position.

17. The non-transitory computer-readable medium storing program code of claim 15, wherein the program code when executed is operative to cause the electronic processor to perform the further steps of:

presenting one or more virtual orbs in apparent motion along one or more virtual paths, each unrelated to the eyewear device location, from the distal position toward the scoring plane position;

establishing the orb proximity relative to the scoring plane position, wherein the orb proximity comprises a region selected from a shape consisting of a two-dimensional area and a three-dimensional polyhedron;

detecting the eyewear device location within the orb proximity associated with any of the one or more virtual orbs and the scoring plane position; and presenting the current orb count at an information position relative to the display.

18. The non-transitory computer-readable medium storing program code of claim 15, wherein the program code when executed is operative to cause the electronic processor to perform the further steps of:

presenting the virtual orb in apparent motion along either a left virtual path or a right virtual path, selectively, wherein each of the left virtual path and the right virtual path is unrelated to the eyewear device location, such that the virtual orb in apparent motion facilitates a lateral exercise experience, wherein the repetitive motion of the eyewear device relative to the physical environment is primarily lateral; and selectively changing the virtual orb from the left virtual path to the right virtual path in accordance with the apparent motion from the distal position toward the scoring plane position.

19. The non-transitory computer-readable medium storing program code of claim 15, wherein the program code when executed is operative to cause the electronic processor to perform the further steps of:

sizing the virtual orb relative to the virtual path, such that the virtual orb appears progressively larger in accordance with the apparent motion from the distal position toward the scoring plane position.

20. The non-transitory computer-readable medium storing program code of claim 15, wherein the program code when executed is operative to cause the electronic processor to perform the further steps of:

presenting on the display a good virtual orb and a bad virtual orb;

changing the good virtual orb into the bad virtual orb during the apparent motion;

detecting whether the eyewear device location is within the orb proximity of the good virtual orb and the scoring plane position, and in response incrementing the current orb count by one; and detecting whether the eyewear device location is outside the orb proximity of the bad virtual orb and the scoring plane position, and in response incrementing the current orb count by one.

\* \* \* \* \*